(12) United States Patent
Fahlenkamp

(10) Patent No.: US 9,590,513 B2
(45) Date of Patent: *Mar. 7, 2017

(54) METHODS FOR OPERATING A CONVERTER

(71) Applicant: Infineon Technologies AG, Neubiberg (DE)

(72) Inventor: Marc Fahlenkamp, Geretsried (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 171 days.

This patent is subject to a terminal disclaimer.

(21) Appl. No.: 14/533,117

(22) Filed: Nov. 5, 2014

(65) Prior Publication Data
US 2015/0138847 A1    May 21, 2015

Related U.S. Application Data

(63) Continuation of application No. 13/103,198, filed on May 9, 2011, now Pat. No. 8,953,341.

(51) Int. Cl.
*H02M 3/335* (2006.01)
*H02M 3/337* (2006.01)
*H02M 1/00* (2006.01)

(52) U.S. Cl.
CPC ... *H02M 3/33523* (2013.01); *H02M 3/33553* (2013.01); *H02M 3/3376* (2013.01); *H02M 2001/0035* (2013.01); *Y02B 70/16* (2013.01)

(58) Field of Classification Search
CPC ......... H02M 2001/0032; H02M 3/335; H02M 3/33523; H02M 3/33553; H02M 3/33592
See application file for complete search history.

(56) References Cited

U.S. PATENT DOCUMENTS

| | | | | |
|---|---|---|---|---|
| 5,883,795 A | * | 3/1999 | Farrington | ........ H02M 3/33538 363/21.04 |
| 6,344,980 B1 | * | 2/2002 | Hwang | ............... H02M 1/4258 363/21.01 |
| 7,002,814 B2 | * | 2/2006 | Kim | .......................... G06F 1/26 363/21.15 |
| 8,502,420 B1 | * | 8/2013 | Mogilevski | ....... H02M 3/33592 307/151 |

(Continued)

*Primary Examiner* — Fred E Finch, III
(74) *Attorney, Agent, or Firm* — Viering, Jentschura & Partner mbB

(57) ABSTRACT

A converter may include a transformer; a first circuit arrangement coupled to a first transformer side; a second circuit arrangement coupled to a second transformer side, wherein the second circuit arrangement is configured to provide an output voltage; a first coupler configured to provide information about the output voltage to the first circuit arrangement; wherein the first circuit arrangement is configured to determine a state of the secondary side based on the received information about the output voltage, and to generate a switch control signal dependent on the determined state; a switch circuit arranged on the second side; and a second coupler configured to provide a switch control signal from the first circuit arrangement to the switch circuit; wherein the switch circuit is coupled to the first circuit arrangement to provide a first circuit arrangement control signal to the first circuit arrangement depending on the switch control signal.

28 Claims, 14 Drawing Sheets

(56) References Cited

U.S. PATENT DOCUMENTS

| | | | | |
|---|---|---|---|---|
| 2001/0010638 A1* | 8/2001 | Konno | ............... | H02M 3/335 363/21.07 |
| 2002/0036910 A1* | 3/2002 | Yang | ............... | H02M 3/33507 363/21.07 |
| 2003/0142515 A1* | 7/2003 | Kim | ............... | G06F 1/266 363/21.15 |
| 2004/0052093 A1* | 3/2004 | Kim | ............... | H02M 3/33523 363/21.01 |
| 2006/0267565 A1* | 11/2006 | Louvel | ............... | H04N 5/63 323/282 |
| 2010/0135050 A1* | 6/2010 | Sonobe | ............... | H02M 1/36 363/21.07 |
| 2010/0309694 A1 | 12/2010 | Huang et al. | | |
| 2011/0255315 A1* | 10/2011 | Ono | ............... | H02M 1/36 363/49 |
| 2013/0215651 A1* | 8/2013 | Liao | ............... | H02M 5/40 363/34 |

* cited by examiner

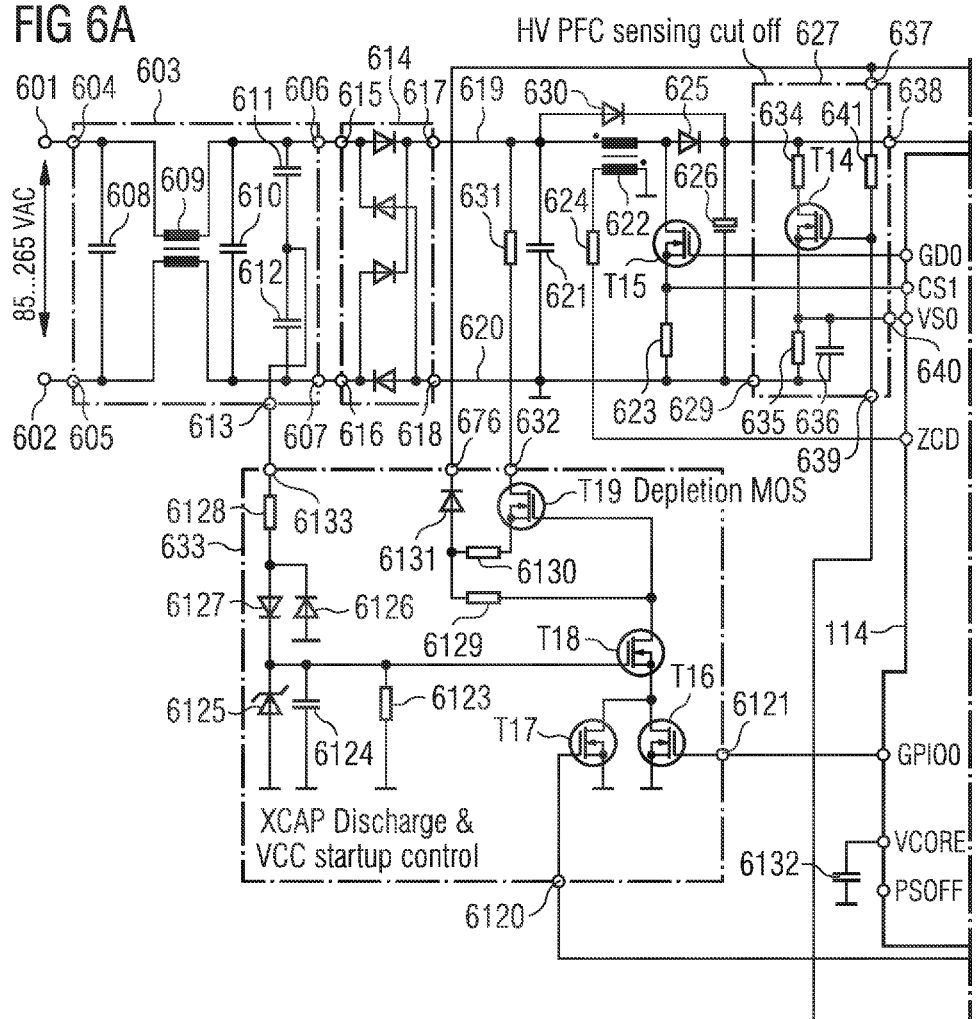
FIG 6A
FIG 6
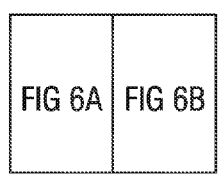

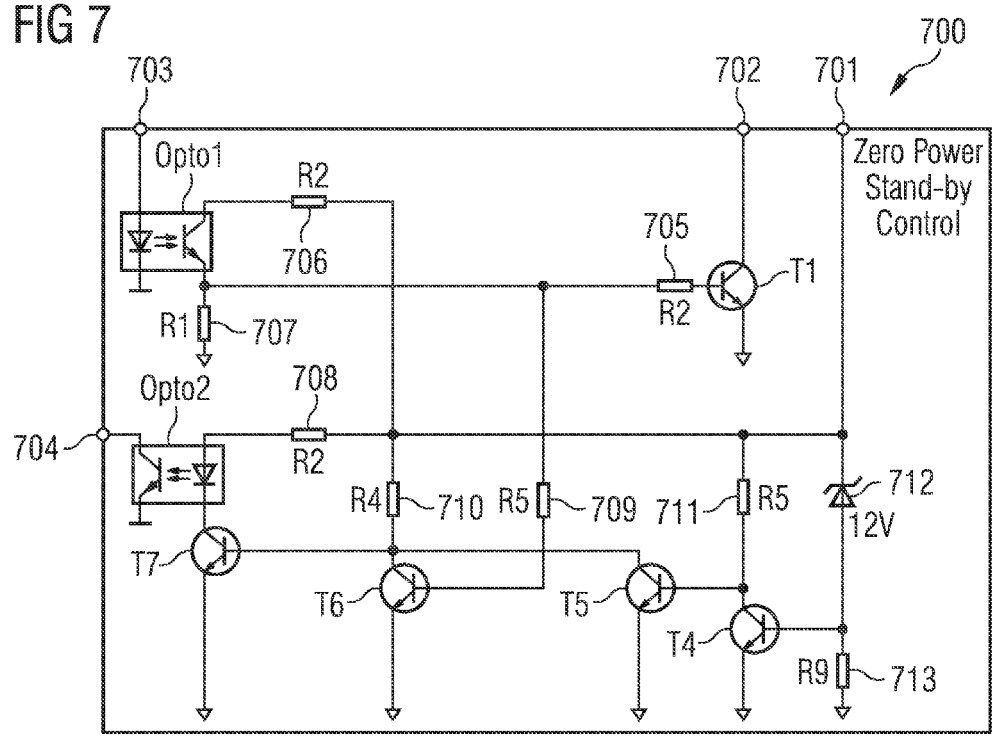
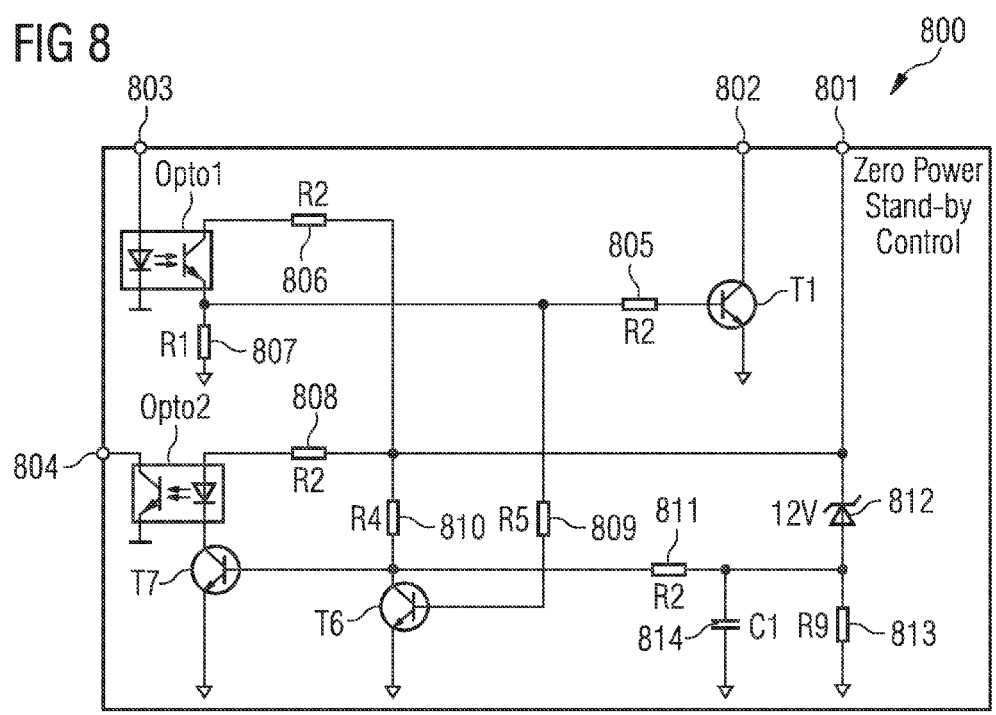

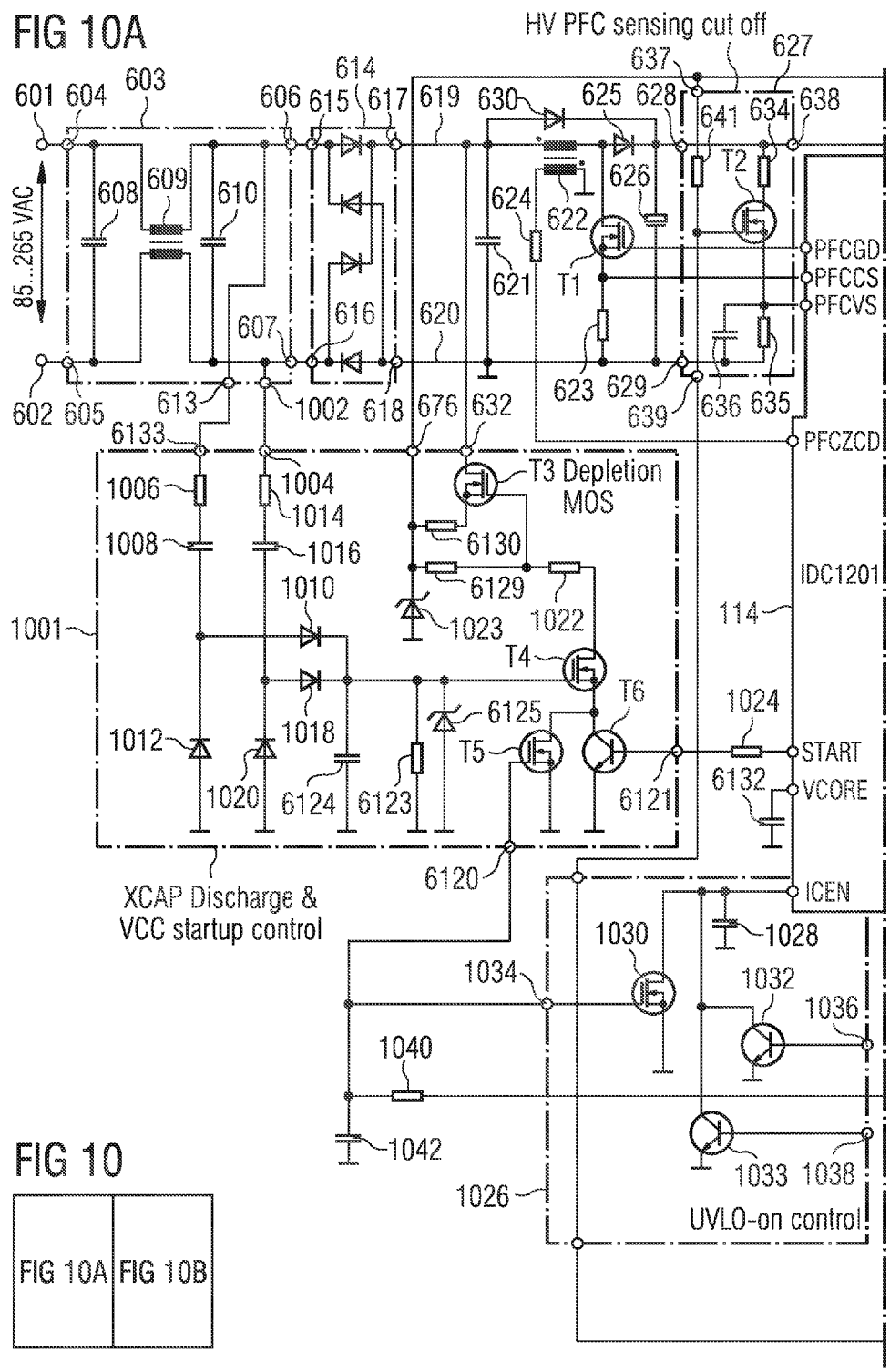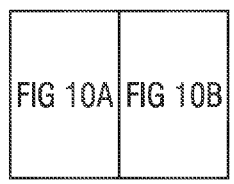

METHODS FOR OPERATING A CONVERTER

RELATED APPLICATION(S)

The present application is a continuation of U.S. patent application Ser. No. 13/103,198, filed May 9, 2011, the contents of which are incorporated herein by reference in its entirety for all purposes.

TECHNICAL FIELD

Various embodiments relate generally to a converter.

BACKGROUND

Switch-mode power supplies (SMPSs) may generally have the demand to provide a high total efficiency over the entire output power range and a low stand-by power consumption in a so-called "no load" operation mode, in which no load is connected to the output of the SMPS.

In a conventional SMPS, there exists the attempt to optimize the system costs by using as little components as possible. Usually, the following three main criteria may be tried to be optimized: "high total efficiency", "low stand-by power consumption", and "low system costs".

In order to achieve a high total efficiency, conventionally a resonant converter is used for the main power stage, which, however, does usually not achieve the required low power consumption in the stand-by operation mode.

Furthermore, there is the attempt to achieve a "no load" stand-by power consumption below 5 mW, which is also referred to as "zero power".

In a first conventional approach, an additional auxiliary power supply is provided in addition to the main power stage. This approach is usually provided in a complex system such as in a LCD-TV set. The main power stage is switched off in the stand-by mode. The auxiliary power supply is usually dimensioned for low power and thus for a low power requiring load. A load requiring more power is supplied by the main power stage. This results in a main power stage having a plurality of output phases. This results in high costs, since an additional DC-DC SMPS circuit is provided for a particular main power stage.

In another approach, which does not provide an auxiliary power supply in addition to the main power stage, a specific burst mode of the main power stage is provided to reduce the average power consumption to a minimum. However, the specific burst mode has the disadvantage of introducing a ripple into the output voltage.

Various implementation concepts are usually provided:

In one approach, a controller TEA 1713 from NXP Semiconductors is provided as a controller for a main power stage of a resonant LLC converter for a notebook adapter. In this approach, a comparator evaluates a feedback output signal provided from an optocoupler. A controller deactivation signal to deactivate the controller is generated in case that the level of the evaluated signal becomes lower than a load threshold. In case the level of the evaluated signal becomes higher than an upper threshold, a controller activation signal to activate the controller is generated.

This approach is altered in another approach, namely in the active-burst mode configuration in the CoolSET circuit available from Infineon Technologies AG in that comparators are integrated in the controller component, wherein the comparators are configured to evaluate the signals coming from the optocoupler.

Both previously described approaches have in common that they provide an evaluation circuit and a control circuit, which are completely acting on the primary side of the converter. One result of these approaches is that the controller component usually needs to remain active during the switch-off period. Thus, the power consumption associated therewith limits the maximum switch-off time. In case the controller component would be deactivated during the switch-off period, the response time in response to an abrupt load change might be extended, since the own power supply may have been interrupted for too long. Another effect may be caused by the fact that the output voltage may not be directly measured at the secondary side, since the arrangement including the optocoupler and the regulatory circuit at the secondary side usually only transmits an error signal to the controller component at the primary side, wherein the error signal serves as a basis for the generation of the pulse width modulation.

Another approach provides the entire evaluation and control functions at the secondary side of the SMPS. This may result in increased system costs.

SUMMARY

Various embodiments provide a converter. The converter may include a transformer including a primary side and a secondary side; a primary side circuit arrangement coupled to the primary side of the transformer; a secondary side circuit arrangement coupled to the secondary side of the transformer, wherein the secondary side circuit arrangement is configured to provide at least one of an output voltage and an output current; a first coupling component configured to provide information about at least one of the output voltage and the output current to the primary side circuit arrangement; wherein the primary side circuit arrangement is configured to determine a state of the secondary side based on the received information, and to generate a switch control signal dependent on the determined state; the converter further including a switch circuit arranged on the secondary side; and a second coupling component coupled to the primary side circuit arrangement and to the switch circuit, and configured to provide a switch control signal from the primary side circuit arrangement to the switch circuit, wherein the switch circuit is coupled to the primary side circuit arrangement to provide a primary side circuit arrangement control signal to the primary side circuit arrangement depending on the switch control signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 6, 6A, and 6B show an implementation of the converter shown in FIG. 1 in accordance with various embodiments;

FIG. 7 shows an implementation of the switch circuit in accordance with various embodiments;

FIG. 8 shows yet another implementation of the switch circuit in accordance with various embodiments;

FIGS. 10, 10A, and 10B show a further implementation of the converter shown in FIG. 1 in accordance with various embodiments;

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various embodiments provide a converter which achieve a "no load" power consumption as low as possible in a power supply, which is not dominated by the main power stage. The no load state is e.g. defined by a state in which no load is connected to the output of the converter.

Figure 1:
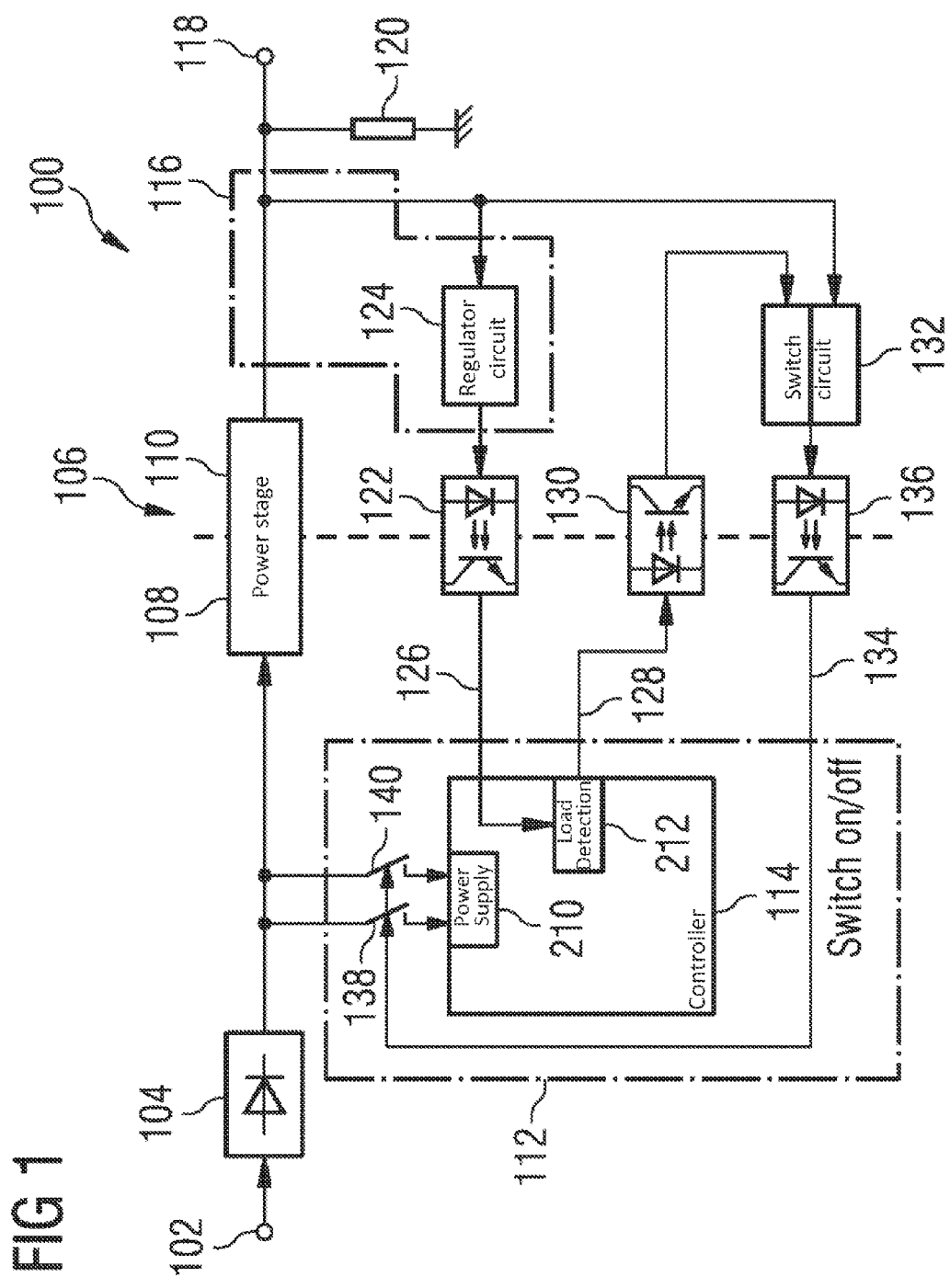
FIG. 1 shows a converter in accordance with various embodiments.

FIG. 1 shows a converter 100 in accordance with various embodiments.

As shown in FIG. 1, the converter 100 may include one or more input terminals 102 to which (in the case of an AC-DC converter 100) an AC voltage to be converted may be applied. The one or more input terminals 102 may be coupled to a rectifying circuit 104. Furthermore, in various embodiments, a power stage 106, e.g. a transformer 106, may be coupled downstream to the rectifying circuit 104. The transformer 106 has a primary side 108 (which may include one or more primary windings), and a secondary side 110 (which may include one or more secondary windings), and a magnetic core (e.g. a ferromagnetic or ferrimagnetic core; e.g. made of a ferromagnetic or ferrimagnetic material such as e.g. iron or a material (e.g. an alloy) including iron). In various embodiments, the primary side 108 of the transformer 106 and the secondary side 110 of the transformer 106 are galvanically separated from each other and inductively coupled with each other by means of the magnetic core (the magnetic core may run through the one or more primary windings and the one or more secondary windings, for example).

In various embodiments, the converter 100 may be configured as a DC-DC converter 100. In this case, the rectifying circuit 104 is not provided, and a DC voltage may be applied to the one or more input terminals 102. In various embodiments, the converter 100 may be configured as an isolated switched mode power supply.

In various embodiments, the converter 100 may be configured as a forward converter or as a reverse converter. In various embodiments, the converter 100 may be configured as a converter such as e.g. a boost converter; a buck converter; a boost/buck converter; and/or a flyback converter. In various embodiments, the converter 100 may be configured as a half-bridge converter or as a full-bridge converter. In various embodiments, the converter 100 may be configured as a switch mode power supply converter. In various embodiments, the converter 100 may be configured as a synchronous converter. In various embodiments, the converter 100 may be configured as a multiphase converter, e.g. as a multiphase synchronous converter. In various embodiments, the converter 100 may be configured as a push-pull converter. In various embodiments, the converter 100 may be configured as a resonant converter, e.g. as a parallel resonant converter or as an LLC resonant converter.

In various embodiments, the converter 100 may further include a primary side circuit arrangement 112 coupled to the primary side 108 of the transformer 106. In various embodiments, as will be described in more detail below, the primary side circuit arrangement 112 may include a controller 114 configured to control the current flow through the primary side 108 (e.g. through the one or more primary windings) of the transformer 106.

Figure 2:
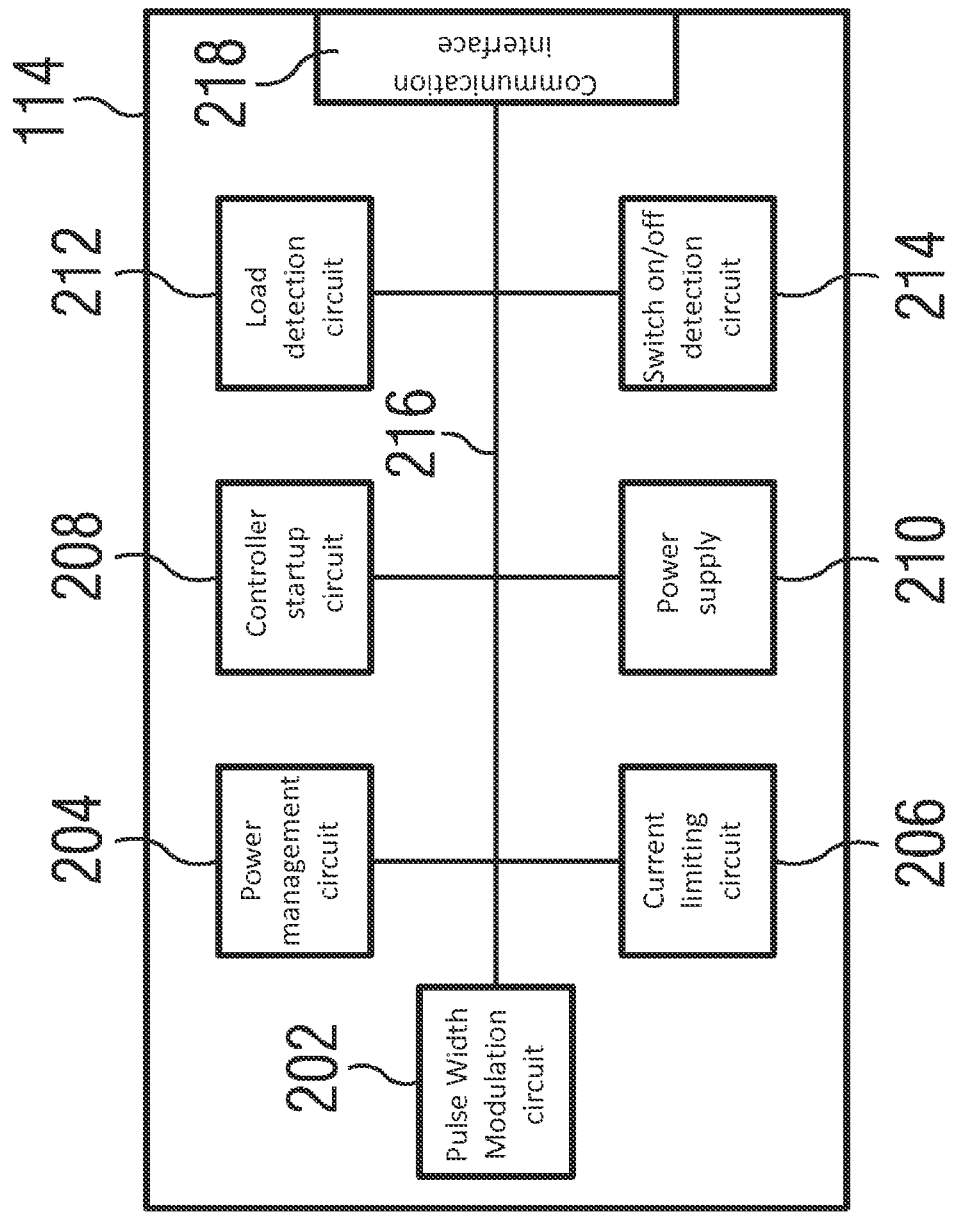
FIG. 2 shows a controller of the converter of FIG. 1 in accordance with various embodiments.

FIG. 2 shows the controller 114 of the converter 100 of FIG. 1 in accordance with various embodiments in more detail. The controller 114 may include a modulation circuit 202 configured to provide at least one switch control signal to at least one switch of the converter 100, which will be described in more detail below. In various embodiments, the modulation circuit 202 may be configured as a pulse width modulation (PWM) circuit 202 or as a pulse frequency modulation (PFM) circuit 202. In various embodiments, the controller 114 may further include a a power management circuit 204 configured to provide power management for the controller 114. In various embodiments, the controller 114 may further include a current limiting circuit 206. In various embodiments, the controller 114 may further include a controller startup circuit 208. The controller startup circuit 208 may be configured to activate the controller 114 after it has been deactivated due to a detection of a low load state which will be described in more detail below. In various embodiments, the controller 114 may further include a power supply 210. In various embodiments, the controller 114 may further include a load detection circuit 212. The load detection circuit 212 may be configured to detect the load connected to an output 118 of the converter 100. According to various embodiments, the load detection circuit 212 may be further configured to detect a low load state of the converter 100 which will be described in more detail further below. In various embodiments, the controller 114 may further include a switch on/off detection circuit 214. The switch on/off detection circuit 214 may be configured to determine whether the power supply 210 is to be switched on or switched off based on a signal provided from a switch circuit 132 and consequently activate or deactivate the power supply 210. The circuit modules just described which may be provided within the controller 114 may be communicatively coupled with each other by a communication bus 216. Furthermore, the communication bus 216 may be coupled to a communication interface 218 which is provided to establish electrical contact between the modules of the controller 114 and surrounding circuitry the controller might be embedded into. The communication interface 218 may, for example, include pins or terminals to which external leads can be coupled. The one or more pins or terminals may be dedicated, i.e. solely provided for contacting a specific circuit module within the controller 114, or they can be coupled to more than one circuit module.

In various embodiments, the controller 114 may include a plurality of discrete circuit components (e.g. an analog controller including a plurality of discrete logic gates and/or analog amplifier(s)) which may be mounted on a printed circuit board, for example, such as e.g. one or more circuits as described above, or may be configured as a programmable controller (which may be monolithically integrated on a wafer substrate) such as e.g. a microcontroller (e.g. a reduced instruction set computer (RISC) microcontroller or a complex instruction set computer (CISC) microcontroller), or a field programmable gate array (FPGA), or a programmable logic array (PLA) or any other kind of logic circuit.

In various embodiments, the primary side circuit arrangement 112 may further include a controller startup circuit 208 configured to provide a controller startup signal depending on the output voltage and/or the output current provided at the secondary side 110. In various embodiments, the controller 114 may contain the controller startup circuit 208, in other words, the controller startup circuit 208 may be integrated (e.g. monolithically integrally formed) with the controller 114.

In various embodiments, the primary side circuit arrangement 114 optionally may further include a zero current detection circuit (not shown in FIG. 1) configured to detect the current flowing on the primary side 108 of the transformer 106. In various embodiments, the zero current detection circuit may be configured to inductively detect the current flowing on the primary side 108 of the transformer 106.

Referring back to FIG. 1, the converter 100 may further include a secondary side circuit arrangement 116 coupled to the secondary side 110 of the transformer 106, wherein the secondary side circuit arrangement 116 may be configured to provide at least one of an output voltage and an output current. The secondary side circuit arrangement 116 may include one or more output terminals 118, at which one or more output voltages and/or one or more output currents are provided for a load 120, e.g. a load circuit 120. The one or more output terminals 118 may be coupled to the second side 110 (e.g. the one or more secondary windings) of the transformer 106. Depending on the application, the load 120 may include one or more electronic circuits or even complex electronic systems such as e.g. a computer such as a laptop, a notebook, a netbook; or a personal digital assistant (PDA); a mobile phone; a smart phone, etc.

Furthermore, the controller 114 may further include a power supply circuit 210 and/or a load detection circuit 212).

Furthermore, in various embodiments, the converter 100 may further include a first coupling component 122 (e.g. implemented as a first optocoupler 122) configured to provide information 126 about the output voltage and/or the output current to the primary side circuit arrangement 112. In various embodiments, the information 126 about the output voltage and/or the output current may be the error signal, which may be generated by an optional regulator circuit 124, which is optionally provided in the secondary side circuit arrangement 116. In various embodiments, the information 126 about the output voltage and/or the output current may be the output voltage and/or output current itself, e.g. weighted with a predefined factor. An input of the first coupling component 122, e.g. the first optocoupler 122, may be coupled to the one or more output terminals 118, e.g. via the secondary side circuit arrangement 116, e.g. via the optional regulator circuit 124. An output of the first coupling component 122, e.g. the first optocoupler 122, may be coupled to an input of the primary side circuit arrangement 112, e.g. to an input of the load detection circuit 212. In various embodiments, the first coupling component 122 may be configured to provide a transmission of a signal, e.g. the information 126 about the output voltage and/or the output current, via a galvanic separation between the primary side circuit arrangement 112 and the secondary side circuit arrangement 116, e.g. from the secondary side circuit arrangement 116 to the primary side circuit arrangement 112.

In various embodiments, the primary side circuit arrangement 112 may be configured to determine a state of the secondary side 110 of the transformer 106 based on the received information 126 about the output voltage and/or the output current, and to generate a switch control signal 128 dependent on the determined state. In various embodiments, the primary side circuit arrangement 112 may be configured to determine a state in which the output voltage is lower than a predefined threshold voltage as the determined state (which may be referred to as low load state or even no load (or zero load) state, illustratively representing a state in which substantially no load 120 is coupled to the output 118 of the converter 100).

Figure 3:
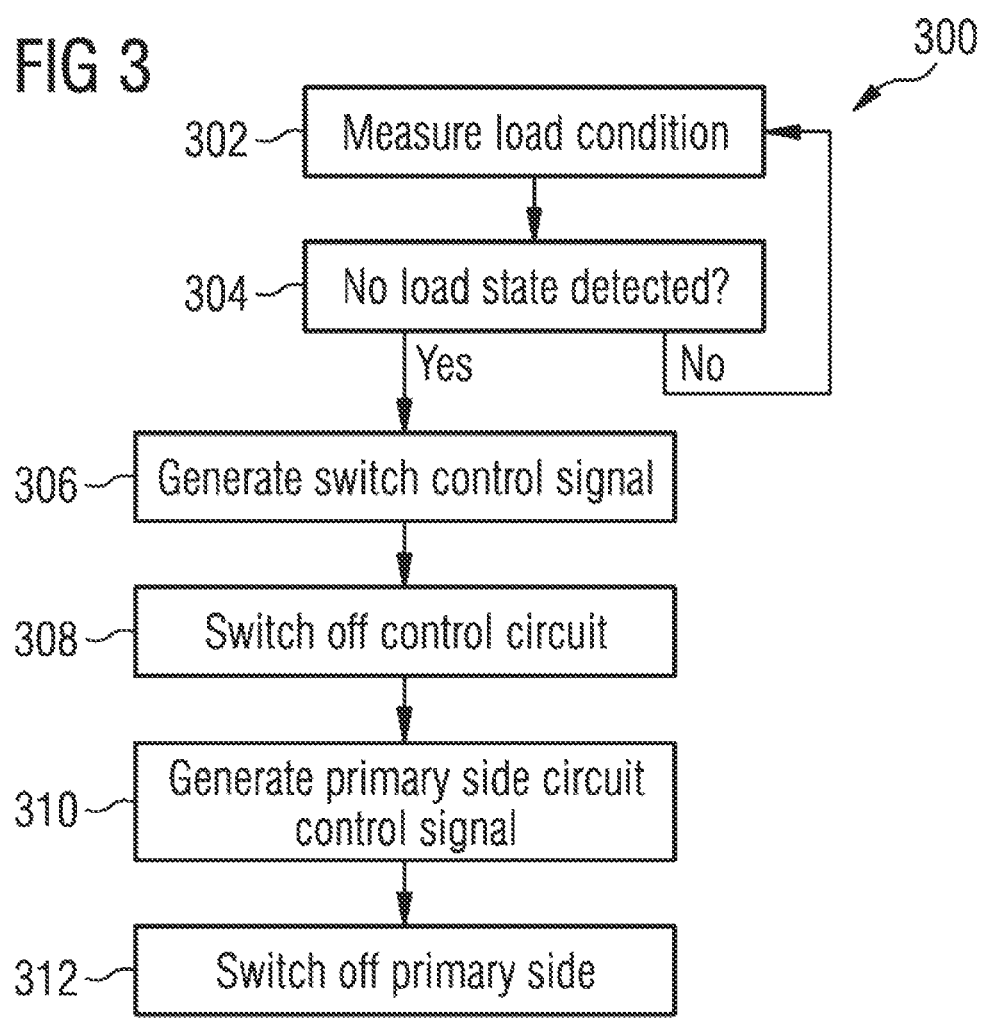
FIG. 3 shows a flow diagram illustrating a method for changing the state of the converter in accordance with various embodiments.

FIG. 3 shows a flow diagram 300 illustrating a method for changing the operation state of the converter 100 from a normal operation mode, which will be described below to a stand-by power saving state in which the converter 100 is switched off. This transition is initiated upon detecting that the converter 100 in accordance with various embodiments, e.g. its secondary side 110, has entered or is in a low load state or no load state.

During the normal operation mode, the regulator circuit 124 provides a signal to the controller 114 from which in a first step 302 the controller 114 is able to measure or determine the load condition of the secondary side 110. The load condition is compared by the load detection unit 212, for example, to a no load condition, e.g. by the means of comparing the value of the signal provided by the regulator circuit 124 to a predefined threshold. Thus, in 304 the no load state can be detected based on this comparison. If the no load sate is not detected, the converter 100 continues to operate in the normal operation mode and 302 and 304 are performed in the form of a loop process, i.e. a constant and continuous monitoring process, wherein the monitoring may just as well take place at sampling intervals of a certain frequency.

Upon detection of the no load state, in step 306 the switch control signal 128 is generated by the controller 114, e.g. by the load detection unit 212, and transmitted to the switch circuit 132 on the secondary side 110 of the converter 100 by the means of a second coupling component, such as the second optocoupler 130. This operation, for example, may include changing the switch control signal 128 from a high value to a low value, such that the second optocoupler 130 is deactivated. The switch circuit 132 arranged on the secondary side 110 of the converter 100 may be thus switched off in step 308, for example by deactivating certain electronic components such as transistors within the control circuit. In the course of deactivating the switch circuit 132 a primary side circuit control signal 134 may be generated in step 310 and a third coupling component, such as a third optocoupler 136, may be used to transmit the primary side circuit arrangement control signal 134 to the primary side 108 of the controller 100. Finally, in step 312, the primary side 108 of the converter 100 may be switched off due to the reception of the appropriately set primary side circuit arrangement control signal 134.

In case the primary side circuit arrangement 112, e.g. the controller 114, determines the (e.g. predefined) state of the secondary side 110, e.g. the "no load" state, the primary side circuit arrangement 112, e.g. the controller 114, may generate the switch control signal 128 at an output, e.g. an output pin, of the primary side circuit arrangement 112, e.g. the controller 114, e.g. the load detection circuit 212 thereof.

In various embodiments, the converter 100 may further include the second coupling component 130 (e.g. implemented as a second optocoupler 130) configured to provide the switch control signal 128 from the primary side circuit arrangement 112 to the switch circuit 132, which may be arranged on the secondary side 110. An input of the second coupling component 130, e.g. the second optocoupler 130, may be coupled to the output of the primary side circuit arrangement 112, at which the switch control signal 128 is provided. An output of the second coupling component 130, e.g. the second optocoupler 130, may be coupled to an input of the switch circuit 132. In various embodiments, the second coupling component 130 may be configured to provide a transmission of a signal, e.g. the switch control signal 128, via a galvanic separation between the primary side circuit arrangement 112 and the switch circuit 132, e.g. from the primary side circuit arrangement 112 to the switch circuit 132.

In various embodiments, an output of the switch circuit 132 may be coupled to the primary side circuit arrangement 112 to provide a primary side circuit arrangement control signal 134 to the primary side circuit arrangement 112 depending on the switch control signal 128. In various embodiments, the output of the switch circuit 132 may be coupled to the primary side circuit arrangement 112 via the first coupling component 122 (e.g. the first optocoupler 122), as shown e.g. in the embodiment illustrated in FIG. 5, or via the third coupling component 136 (e.g. a third optocoupler 136). An input of the third coupling component 136, e.g. the third optocoupler 136, may be coupled to the output of the switch circuit 132, at which the primary side circuit arrangement control signal 134 is provided. An output of the third coupling component 136, e.g. the third optocoupler 136, may be coupled to an input of the primary side circuit arrangement 112. In various embodiments, the third coupling component 136 may be configured to provide a transmission of a signal, e.g. the primary side circuit arrangement control signal 134, via a galvanic separation between the primary side circuit arrangement 112 and the switch circuit 132, e.g. from the switch circuit 132 to the primary side circuit arrangement 112.

In various embodiments, the converter 100, e.g. the power stage 106, may further include (at the primary side of the transformer 106, for example) at least one switch coupled e.g. to the controller 114 and the primary side 108 of the transformer 106 such that it determines current flow through the primary side 108 of the transformer 106 depending on a switch control signal provided by the controller 114. The number of switches (e.g. one, two, three, four, five, six, or even more) as well as their arrangement and coupling depends on the type of converter that is actually implemented. In various embodiments, the at least one switch may include at least one transistor, e.g. at least one power transistor, e.g. a field effect transistor, e.g. a metal oxide semiconductor (MOS) field effect transistor, e.g. a power metal oxide semiconductor (MOS) field effect transistor, e.g. a DMOS field effect transistor or a UMOS field effect transistor.

In various embodiments, the primary side circuit arrangement 112 may include one or more power supply switches 138, 140, e.g. a first power supply switch 138 and a second power supply switch 140. A control terminal of the first power supply switch 138 may be coupled to the output of the third coupling component 136 (e.g. a third optocoupler 136) to receive the primary side circuit arrangement control signal 134. A first controlled terminal of the first power supply switch 138 may be coupled to the first side of the power stage 106, e.g. the first side 108 of the transformer 106, and a second controlled terminal of the first power supply switch 138 may be coupled to an input of the power supply circuit 210 of the controller 114, for example. Thus, illustratively, in case the first power supply switch 138 is switched on, the (e.g. rectified) applied input voltage may be supplied to the primary side circuit arrangement 112, e.g. the controller 114, to thereby energize the same. However, in case the first power supply switch 138 is switched off, the (e.g. rectified) applied input voltage may be cut off from the primary side circuit arrangement 112, e.g. the controller 114, to thereby deactivate the same.

A control terminal of the second power supply switch 140 may be coupled to the output of the third coupling component 136 (e.g. a third optocoupler 136) to receive the primary side circuit arrangement control signal 134. Moreover, in various embodiments, a first controlled terminal of the second power supply switch 140 may be coupled to the first side of the power stage 106, e.g. the first side 108 of the transformer 106 (but downstream with respect to the node at which the first controlled terminal of the first power supply switch 138 may be coupled), and a second controlled terminal of the second power supply switch 140 may be coupled to an input of the power supply circuit 210 of the controller 114, for example. Thus, illustratively, in case the second power supply switch 140 is switched on, the (e.g. rectified) applied input voltage may be supplied to the primary side circuit arrangement 112, e.g. the controller 114, to thereby energize the same. However, in case the first power supply switch 138 is switched off, the (e.g. rectified) applied input voltage may be cut off from the primary side circuit arrangement 112, e.g. the controller 114, to thereby deactivate the same.

In the following, the operation of the converter 100 according to various embodiments will be described. In what hereinafter will be referred to as the normal operation mode, a DC voltage (e.g. in the range from about 50 V to about 1 kV or even more) or an AC voltage (e.g. in the range from about 85 V to about 270 V; it is to be noted that the circuit in accordance with various embodiments can be operated in a wider range such as e.g. in the range from about 50 V to about 1 kV or even more) to be converted is applied to the one or more input terminals 102. The power supply 210 of the controller 114 is supplied with supply voltage via the first power supply switch 138 and/or the second power supply switch 140. The modulation circuit 202 of the controller 114 (if present) (in general, the primary side circuit arrangement 112) may provide the at least one switch control signal to the at least one switch of the converter 100. The at least one switch control signal controls the at least one switch of the converter 100 such that the at least one switch of the converter 100 provides the current and/or voltage applied to the one or more input terminals 102 to the primary side 108 of the converter in a clocked or switched manner. Thereby, a current and/or voltage is induced in the secondary side 110 of the converter 106, wherein its mean value corresponds to the desired converted DC voltage which may be provided at the one or more output terminals 118 of the converter 100. During the normal operation mode of the converter 100, the first coupling component 122 (e.g. implemented as a first optocoupler 122) provides information 126 about the output voltage and/or the output current to the primary side circuit arrangement 112. The information 126 about the output voltage and/or the output current can be evaluated by the load detection circuit 212 of the controller 114 and illustratively represents a feedback signal from the secondary side 110 of the converter 106. The primary side circuit arrangement 112, e.g. the modulation circuit 202 of the controller 114, can adapt the at least one switch control signal on the basis of the information 126 about the output voltage and/or the output current such that the rate at which the at least one switch of the converter 100 provides the current and/or voltage applied to the one or more input terminals 102 to the primary side 108 of the converter in a clocked or switched manner is adapted. Hence, the adapting of the switch control signal may result in adapting the current and/or voltage which is induced in the secondary side 110 of the converter 106 such that its mean value is also adapted correspondingly. Therefore, by means of adapting the at least one switch control signal the controller 114 can set the value of the desired converted DC voltage which is provided at the one or more output terminals 118 of the converter 100 in accordance with e.g. a PWM or a PFM.

The information 126 about the output voltage and/or output current which is provided to the primary side circuit arrangement 112, for example the controller 114, from the secondary side circuit arrangement 116 is further evaluated by the load detection circuit 212. The load detection circuit 212 is configured to detect a state of the secondary side circuit arrangement 116 in which substantially no load is coupled to the output 118 of the converter 100. In the following, this state will be referred to as low load state or even no load (or zero load) state. The detection process may include comparing one or more values evaluated from the information 126 about the output voltage and/or output current to one or more predefined threshold values. The detection process may yield a result based on the comparison of the one or more values to the one or more predefined threshold values and hence determine whether a low load state is present on the secondary side circuit arrangement 116. As long as the low load state is not detected, the converter 100 continues to operate in normal operation mode in accordance e.g. with a PWM or a PFM mode. Upon detection of the low load state, the load detection circuit 212 generates a switch control signal 128 which is transmitted to the switch circuit 132 via the second coupling component 130 (e.g. implemented as a second optocoupler 130). The switch control signal 128 deactivates the controller 114. Depending on the switch control signal 128, the switch circuit 132 can provide the primary side circuit arrangement control signal 134 to the primary side circuit arrangement 112 via the third coupling component 136 (e.g. implemented as a third optocoupler 136). In this case, the primary side circuit arrangement control signal 134 is configured such that, when received by the primary side circuit arrangement 112, it will effect a deactivation of the controller 114. The primary side circuit arrangement control signal 134 can result in opening at least one of the first power supply switch 138 and the second power supply switch 140. Thereby, the power supply 210 is cut off from power supply and hence the controller 114 enters the deactivated mode (i.e. it is deactivated). In addition, the switch circuit 132 can effect a deactivation of the first coupling component 122 (process not represented in the simplified schematic displayed in FIG. 1). Thereby, the transmission of the information 126 about the output voltage and/or output current from the secondary side circuit arrangement 116 to the primary side circuit arrangement 112 is discontinued.

During the time the controller 114 is deactivated, the switch circuit 132 monitors the output voltage and/or the output current provided at the output 118 of the converter 100. The monitoring process can include comparing the output voltage and/or the output current to a threshold voltage and/or a threshold current, respectively. If the output voltage and/or the output current falls below the threshold voltage and/or current, the switch circuit 132 can provide the primary side circuit arrangement control signal 134 to the primary side circuit arrangement 112 via the third coupling component 136 to reactivate the controller 114. The reactivation of the controller is effected by providing power to the power supply 210 of the controller 114, e.g. by closing the at least one of the first power supply switch 138 and the second power supply switch 140. In addition, the switch circuit 132 reactivate the first coupling component 122 (process not represented in the simplified schematic displayed in FIG. 1), such that transmission of the information 126 about the output voltage and/or output current from the secondary side circuit arrangement 116 to the primary side circuit arrangement 112 is resumed. Hence, the controller 114 returns to the normal operation mode.

Figure 4:
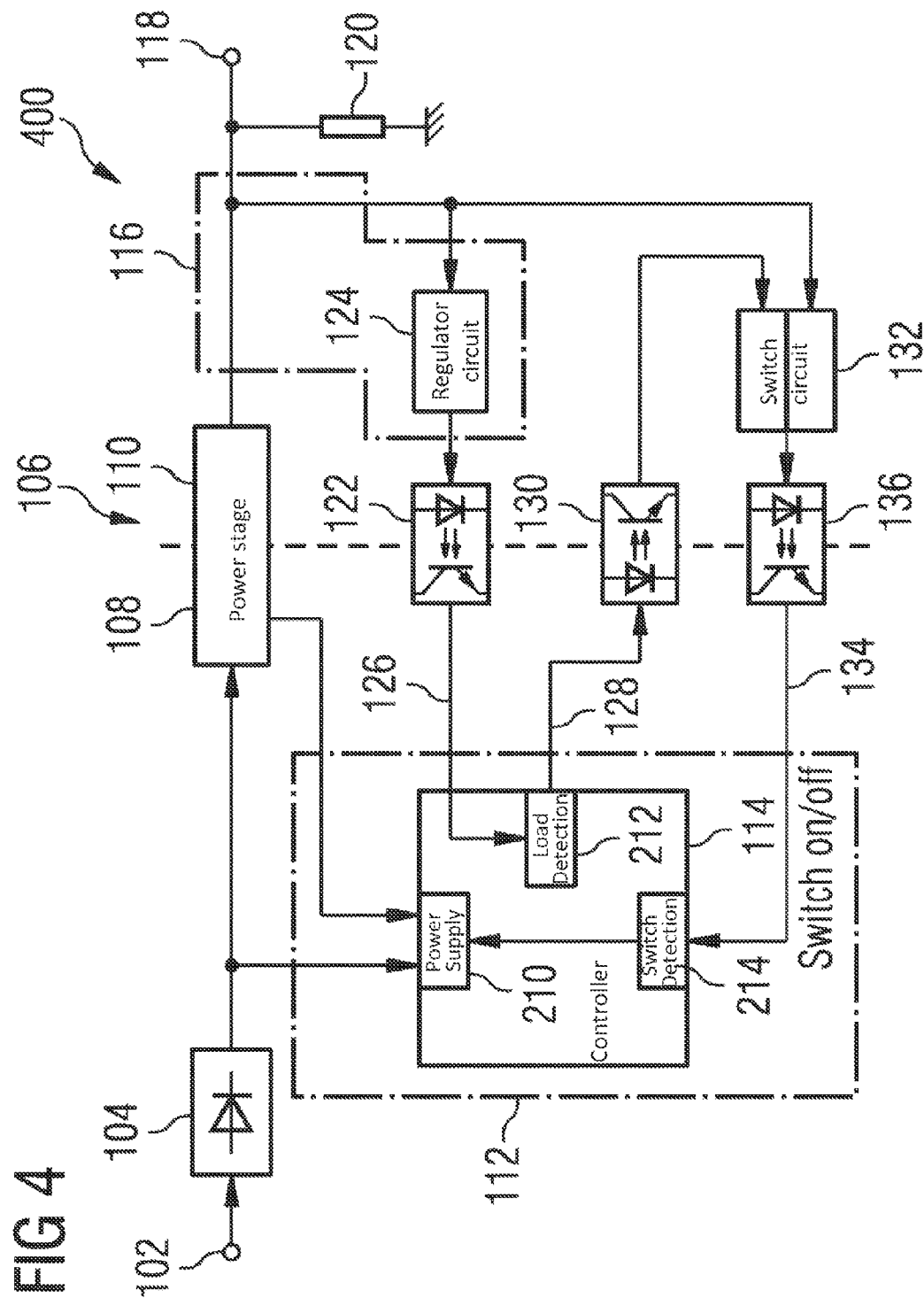
FIG. 4 shows another converter in accordance with various embodiments.

FIG. 4 shows another converter 400 in accordance with various embodiments. The converter 400 shown in FIG. 4 corresponds to a modification of the converter 100 shown in FIG. 1. Therefore, the same components will be labelled with the same reference numbers and only the differences with respect to the converter 100 shown in FIG. 1 will be described in detail.

The aspect distinguishing the converter 100 shown in FIG. 1 from the converter 400 shown in FIG. 4 pertains to the path of the primary side circuit arrangement control signal 134, which is transmitted from the switch circuit 132 via the third coupling component 136 to the primary side circuit arrangement 112. The converter 100 shown in FIG. 1, where the state of the at least one of the first power supply switch 138 and the second power supply switch 140 is altered (i.e. set into an conducting state or set into a non-conducting state) depending on the primary side circuit arrangement control signal 134 in order to supply to supply the power supply 210 of the controller 114 with power or in order to cut off the power supply 210 from power, is altered in such a way that the primary side circuit arrangement control signal 134 in the converter 400 shown in FIG. 4 is supplied to the controller 114 itself, e.g. to the switch on/off detection circuit 214. Depending on the primary side circuit arrangement control signal 134, the switch on/off detection circuit 214 can either set the power supply 210 of the controller in a first state where it provides the controller 114 with power or it can set the power supply 210 of the controller 114 in a second state where it does not provide the controller 114 with power. Hence, the first state of the power supply 210 effects the normal operation mode of the controller 114 in which the controller 114 is powered by the power supply 210, whereas the second state of the power supply 210 effects the deactivated mode of the controller 114 in which the controller 114 is not powered by the power supply 210. The two operational states of the power supply 210 can be arbitrarily allocated to two states of primary side circuit arrangement control signal 134, such that, for example, a low signal value can indicate the second state and a high signal value can indicate the first state. In other words, the functionality of connecting and disconnecting the controller 114 from power is transferred from the at least one of the first power supply switch 138 and the second power supply switch 140 in the converter 100 according to FIG. 1 into the power supply 210 in the converter 400 shown in FIG. 4. Otherwise the operation of the converter 110 shown in FIG. 4 is equivalent to that shown in FIG. 1, since the modification just described does not change the underlying concept of its operation.

Figure 5:
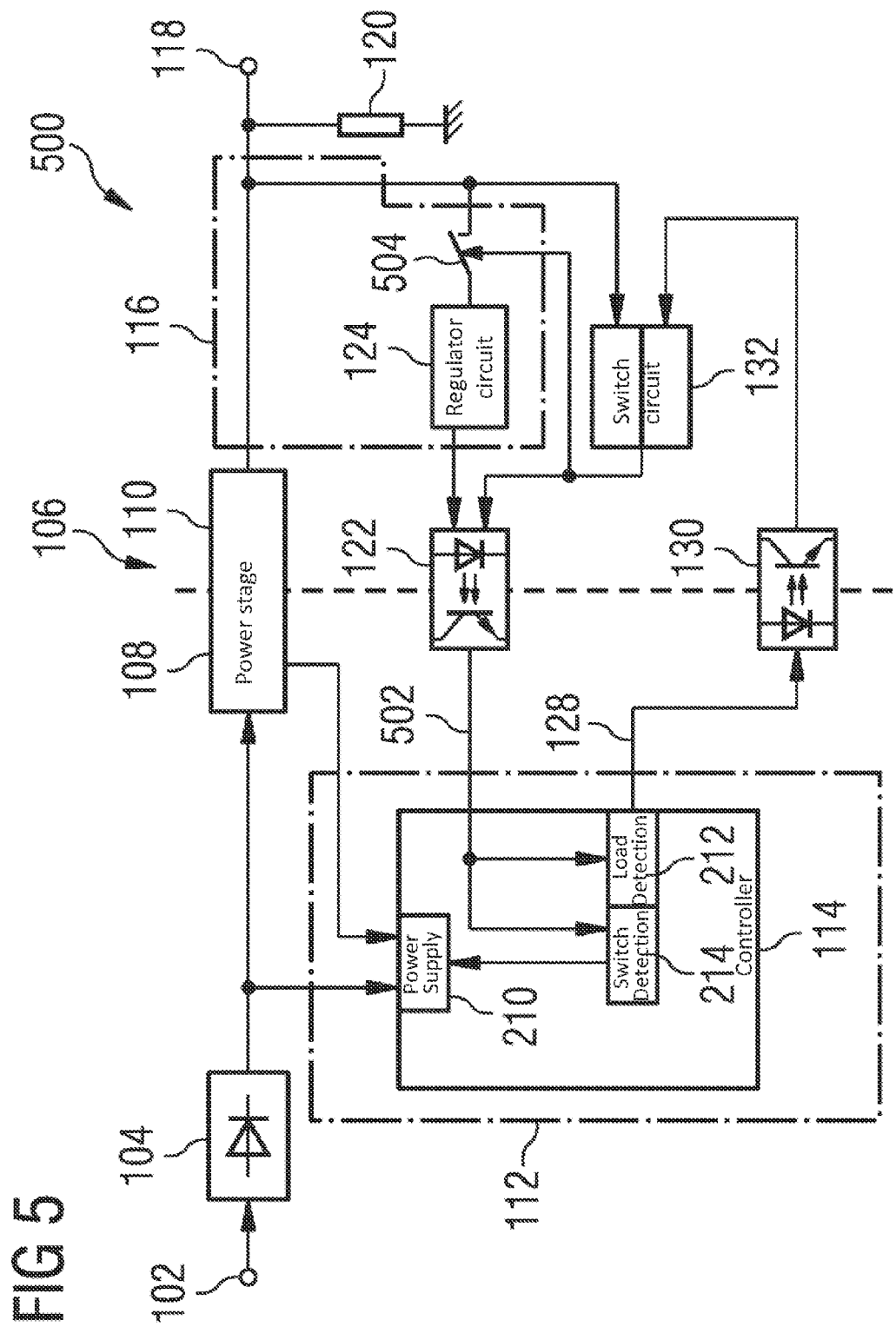
FIG. 5 shows yet another converter in accordance with various embodiments.

FIG. 5 shows yet another converter 500 in accordance with various embodiments. The converter 500 shown in FIG. 5 corresponds to a modification of the converter 400 shown in FIG. 4. Therefore, the same components will be labelled with the same reference numbers and only the differences with respect to the converter 400 shown in FIG. 4 will be described in detail.

The aspect distinguishing the converter 500 shown in FIG. 5 from the converter 400 shown in FIG. 4 pertains to the unification of the first coupling component 122 and the third coupling component 136. In the embodiment of the converter 500 shown in FIG. 5 the first coupling component 122 is configured to transmit a combined secondary side signal 502 from the secondary side circuit arrangement 116 to the primary side circuit arrangement 112. The combined secondary side signal 502 may include the information 126 about the output voltage and/or the output current as well as the primary side circuit arrangement control signal 134. Consequently, the output of the switch circuit 132 is coupled to the first coupling component 122 (instead of being coupled to the third coupling component 136, as shown in FIG. 4). Thus, the information 126 about the output voltage and/or the output current and the primary side circuit arrangement control signal 134 are both provided to the primary side circuit arrangement 112, e.g. the controller 114, e.g. the switch on/off detection circuit 214 and the load detection circuit 212. The switch on/off detection circuit 214 and the load detection circuit 212 can be configured to evaluate the supplied combined secondary side signal 502 from the first coupling component 122 such that the switch on/off detection circuit 214 can determine whether the power supply 210 is to be operated in the first state (corresponds to the normal operation mode of the controller 114) or the second state (corresponds to the deactivated mode of the controller 114) and the load detection circuit 212 can determine whether the low load state is present or not. For example, the switch on/off detection circuit 214 can be configured to evaluate a polarity of the secondary side signal 502 provided by the first coupling component 122 which can indicate whether the controller 114 is to be set into the first state (i.e. powered state, for example) or the second state (i.e. unpowered state, for example). In other words, the polarity may represent the primary side circuit arrangement control signal 134. The load detection circuit 212 may be configured to evaluate the actual value of the combined secondary side signal 502. The actual value may represent the information 126 about the output voltage and/or the output current output. In addition, a deactivation switch 504 may be provided between the one or more output terminals 118 and the first coupling component 122, wherein its state (i.e. conducting or non-conducting) may be set by the signal provided at the output of the switch circuit 132, i.e. the primary side circuit arrangement control signal 134. In dependence on whether the controller 114 to be activated or deactivated, the switch 504 may be opened or closed (i.e. set into a conducing state or set into a non-conducting state). The unification of the first coupling component 122 and third coupling 136 component can lead to reduced manufacturing costs and a more compact design of the converter shown in FIG. 5. The operation of the converter 500 shown in FIG. 5, however, is similar to the operation of the converter 400 shown in FIG. 4.

Figure 6B:
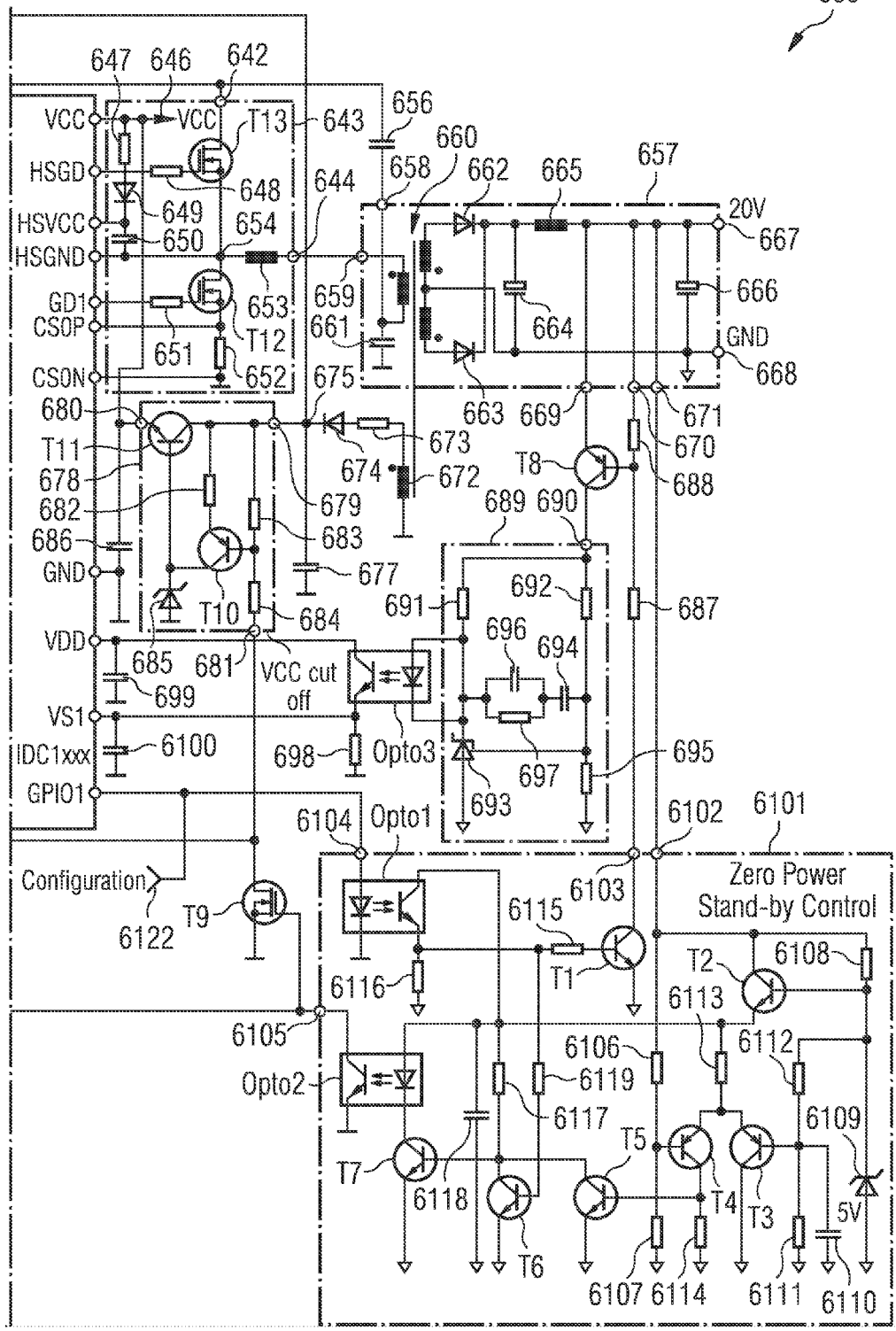

FIG. 6 shows one possible implementation of the converter 100 shown in FIG. 1. The converter 600 has a first input terminal 601 and a second input terminal 602. The first input terminal 601 and the second input terminal 602 are connected to a first input 604 and a second input 605, respectively, of a filtering circuit 603. The filtering circuit 603 may include a first capacitor 608 and a second capacitor 610 coupled in parallel to the first input 604 and the second input 605 of the filtering circuit 603. A first inductor 609 is coupled between the first capacitor 608 and second capacitor 610, wherein the first inductor 609 has a first winding and a second winding which are magnetically coupled with each other and the first winding is coupled in series between the first input 604 and a first output 606 of the filtering circuit 603 and the second winding is coupled in series between the second input 605 and a second output 607 of the filtering circuit 603. A third capacitor 611 and a fourth capacitor 612, coupled in series, are coupled in parallel to the second capacitor 610 and also in parallel to the first output 606 and the second output 607. The filtering circuit 603 is provided with a third output 613 which is coupled to a tap provided between the third capacitor 611 and fourth capacitor 612.

The first output 606 and the second output 607 of the filtering circuit 603 may be coupled to a first input 615 and a second input 616, respectively, of a rectifying circuit 614. An arrangement of four diodes which is also referred to as a full-wave bridge rectifier is coupled between the first input 615 and the second input 616 and a first output 617 and a second output 618 of the rectifying circuit 614.

The first output 617 and the second output 618 of the rectifying circuit 614 are coupled to a first electrical path 619 and a second electrical path 620, respectively. In addition, the first output 617 of the rectifying circuit 614 is connected to a first terminal 632 of a startup control circuit 633 via a third resistor 631. The second path 620 is connected to ground. One contact of a fifth capacitor 621 is coupled to the first path 619 and is further coupled to one end of a first winding of a second inductor 622, the other contact of the fifth capacitor 621 is coupled to a source of a first transistor T15 by a first resistor 623. The second inductor 622 includes the first winding and a second winding which are magnetically coupled with each other, e.g. by a ferromagnetic coil. One end of the second winding is coupled to ground, the other end is connected to a terminal ZCD of the controller 114 by a second resistor 624.

The other end of the first winding of the second inductor 622 is coupled to a drain of the first transistor T15 and further to one contact of a first diode 625. The other contact of the first diode 625 is coupled to one side of a sixth capacitor 626 and to a first input 628 of a PFC (power factor correction) sensing cut off circuit 627. The other side of the sixth capacitor 626 and a second input 629 of the PFC sensing cut off circuit 627 are coupled to the second path 620 and thereby connected to ground. A second diode 630 is additionally coupled in parallel to the first winding of the second inductor 622 and the first diode 625. A gate of the first transistor T15 is coupled to a terminal (e.g. a pin) GD0 of the controller 114 and the source of the first transistor T15, apart from being coupled to ground by the first resistor 623, is further coupled to a terminal CS1 of the controller 114.

Within the PFC sensing cut off circuit 627, a fourth resistor 634, a second transistor T14 and a fifth resistor 635 are coupled in series between the first and second input 628, 629 of the PFC sensing cut off circuit 627, wherein a drain of the second transistor T14 is coupled to the fourth resistor 634 and a source of the second transistor T14 is coupled to the fifth resistor 635. The second resistor 634 is further coupled to a first output 638 of the PFC sensing cut off circuit 627. A gate of the transistor T14 is coupled to a first output 637 of the PFC sensing cut off circuit 637 by a sixth resistor 641 and to a third output 639 of the PFC sensing cut off circuit 627. The source of the second transistor T14, apart from being coupled to the second input 629 by the fifth resistor 635 is additionally coupled to a second output 640 of the PFC sensing cut off circuit 627 and to one side of a seventh capacitor 636, the other side of the capacitor 636 being coupled to the second input 629 of the PFC sensing cut off circuit 627. The second output 640 of the PFC sensing cut off circuit 627 is coupled to a VS0 terminal of the controller 114.

The first output 638 of the PFC sensing cut off circuit is coupled to a first input 642 of a current switching circuit 643. Within the current switching circuit 643, the first input 642 is coupled to a drain of a third transistor T13. A source of the third transistor is coupled to a drain of a fourth transistor T12 via a first node 654. A source of the fourth transistor T12 is coupled to one contact of a seventh resistor 652, the other contact of which is coupled to ground. A CS0N terminal of the controller 114 is coupled to the electrical path between the seventh resistor 652 and ground. The source of the fourth transistor T12 is further coupled to a terminal CS0P of the controller 114. The gate of the third transistor T13 is coupled to a terminal HSGD of the controller 114 via a ninth resistor 648. The gate of the fourth transistor T12 is coupled to a terminal GD1 of the controller 114 via an eighth resistor 651. The first node 654 is further coupled to a first output 644 of the current switching circuit 643 via a third inductor 653 and to a terminal HSGND of the controller 114. One end of an eighth capacitor 650 is coupled to the first node 654, the other end being coupled to a terminal HSVCC of the controller 114 and to a terminal VCC of the controller 114 via a third diode 649 and a tenth resistor 647 arranged in series.

The first output 644 of the current switching circuit 643 is coupled to a second input 659 of a transforming circuit 657. The transforming circuit 657 is further provided with a first input 658 to which the output 638 of the PFC sensing cut off circuit 627 is coupled via a ninth capacitor 656. The first input 658 of the transforming circuit is coupled to ground via a tenth capacitor 661. A first winding of a transformer 660 on its primary side is coupled between the first input 658 and the second input 659 of the transforming circuit 657. The primary side of the transformer 660, e.g. the first winding, is magnetically coupled to its secondary side which is formed by a second and a third winding of the transformer 660. One end of the second winding on the secondary side of the transformer 660 is coupled to a first output 667 of the transforming circuit 657 via a fourth diode 662 and fourth inductor 665 arranged in series. One end of the third winding on the secondary side of the transformer 660 is coupled to the electrical path between the fourth diode 662 and the fourth inductor 665 via a fifth diode 663. One side of an eleventh capacitor 664 is coupled to the electrical path between the fourth diode 662 and the fourth inductor 665, the other side of the eleventh capacitor 664 is coupled to a tap arranged between the second winding and the third winding on the secondary side of the transformer 660 and is further coupled to the second output 668 of the transforming circuit 657. A twelfth capacitor 666 is coupled between the first output 667 and the second output 668 of the transforming circuit 657. The second output 668 is further connected to signal ground. The signal ground can be independent of ground reference or it can be connected to ground. The transforming circuit 657 further has a third output 669, a fourth output 670 and a fifth output 671, wherein all those outputs are coupled to the electrical path between the fourth inductor 665 and the first output 667 of the transforming circuit 657.

A fifth inductor 672 is magnetically coupled to the first winding of the primary side and to the second and third winding of the secondary side of the transformer 660. One end of the inductor 672 is connected to ground, the other end is coupled to a first node 675 via an eleventh resistor 673 and a sixth diode 674. The first node 675 is further coupled to a second terminal 676 of the startup control circuit 633, to a first output 637 of the PFC sensing cut off circuit 627, to a first terminal 679 of a VCC cut off circuit 678 and to ground via a thirteenth capacitor 667.

The VCC cut off circuit 678 further has a second terminal 680 and a third terminal 681. An emitter of a fifth transistor T11 is coupled to the second terminal 680 and a collector of the transistor T11 is coupled to the first terminal 679. An emitter of a sixth transistor T10 is coupled to the first terminal 679 via a thirteenth resistor 682. A base of the sixth transistor T10 is also coupled to the first terminal 679 via a twelfth resistor 683 and it is further coupled to the third terminal 681 of the VCC cut off circuit 678 via a fourteenth resistor 684. A collector of the sixth transistor T10 and a base of the fifth transistor T11 are both connected to ground via a seventh diode 685. The second output 680 of the VCC cut off circuit 678 is coupled to the VCC terminal of the controller 114 and via a fourteenth capacitor 686 to a GND terminal of the controller 114, wherein the GND terminal is eventually connected to ground.

The converter 600 further has a control circuit 689. The control circuit 689 has an input 690 which is coupled to an emitter of a seventh transistor T8. A collector of the seventh transistor T8 is coupled to the third output 669 of the converting circuit 657. A base of the seventh transistor T8 is coupled to the second output 670 of the converting circuit 657 via a fifteenth resistor 688. One contact of a light emitting diode of a third optocoupler Opto3 is coupled to the input 690 via an eighteenth resistor 691, the other contact of the light emitting diode of the third optocoupler Opto3 is coupled to signal ground via an eighth diode 693. One contact of a fifteenth capacitor 694 is coupled to the input 690 of the control circuit 689 via a seventeenth resistor 692 and to signal ground via a twentieth resistor 695. The other contact of the fifteenth capacitor 694 is coupled to one side of a parallel arrangement of a sixteenth capacitor 696 and a nineteenth resistor 697, the other side of the parallel arrangement being coupled to the electrical path between the two contacts of the light emitting diode of the third optocoupler Opto3. A control contact of the eighth diode 693 is coupled to the electrical path between the twentieth resistor 695 and the contact of the fifteenth transistor 694 which is coupled to the seventeenth resistor 692. In addition to the light emitting diode, the optocoupler Opto3 includes a light-sensitive switching element, e.g. a phototransistor. One contact of the phototransistor of the third optocoupler Opto3 is coupled to a VDD terminal of the controller 114, the other contact of the phototransistor of the third optocoupler Opto3 is coupled to a VS1 terminal of the controller 114 and to ground via a twenty first resistor 698. In addition, a seventeenth capacitor 699 is coupled in parallel between ground and the VDD terminal of the controller 114 and an eighteenth capacitor 6100 is coupled in parallel between ground and the VS1 terminal of the controller 114.

The base of the seventh transistor T8, aside from being coupled to the fourth output 670 of the transforming circuit 657 via the fifteenth resistor 688, is also coupled to a first input 6103 of a switch circuit 6101 via a sixteenth resistor 687. A second input 6102 of the switch circuit 6101 is coupled to the fifth output 671 of the transforming circuit 657. The second input 6102 is coupled to signal ground via a series arrangement of a twenty sixth resistor 6106 and a twenty seventh resistor 6107. A collector of an eighth transistor T2 is coupled to the electrical path between the second input 6102 of the switch circuit 6101 and the twenty sixth resistor 6106 and to a base of the same eighth transistor T2 via a twenty ninth resistor 6108. The base of the eighth transistor T2 is further coupled to signal ground via a ninth diode 6109 and via a twenty eighth resistor 6112 to a base of a tenth transistor T3. The base of the tenth transistor T3 is coupled to a parallel arrangement including a twentieth capacitor 6110 and a thirty second resistor 6111, wherein that same parallel arrangement is further connected to signal ground. A collector of the tenth transistor T3 is connected to signal ground, an emitter of the tenth transistor T3 is coupled is connected to an emitter of the eighth transistor T2 via a twenty seventh resistor 6113. The emitter of the tenth transistor T3 is further coupled to an emitter of a ninth transistor T4. A collector of the ninth transistor T4 is connected to signal ground via a thirty first resistor 6114 and to a base of a twelfth transistor T5. The base of the ninth transistor T4 is coupled to the electrical path between the twenty sixth resistor 6106 and the thirtieth resistor 6107. An eleventh transistor T1 is further provided within the switch circuit 6101, wherein its collector is coupled to the first input 6103 of the switch circuit 6101, its emitter is coupled to signal ground and its base is coupled via a twenty second resistor 6115 to the electrical path between a first contact of a phototransistor of a first optocoupler Opto1 and a twenty third resistor 6116, which is eventually connected to signal ground. A second contact of the phototransistor of the first optocoupler Opto1 is coupled to a collector of a thirteenth transistor T6 via a twenty fourth resistor 6117 and to signal ground via a nineteenth capacitor 6118. An emitter of the thirteenth transistor T6 is connected to signal ground and a base of the thirteenth transistor T6 is connected via a twenty fifth resistor 6119 to the electrical path between the twenty second resistor 6115 and the twenty third resistor 6116. One contact of a light emitting diode included in the first optocoupler Opto1 is connected to ground, the other contact is coupled to a third input 6104 of the switch circuit 6101. The second contact of the phototransistor of the first optocoupler Opto1 is further coupled to a first contact of a light emitting diode of a second optocoupler Opto2. A second contact of the light emitting diode of the second optocoupler Opto2 is coupled to a collector of a fourteenth transistor T7. An emitter of the fourteenth transistor T7 is coupled to signal ground and a base of the fourteenth transistor T7 is coupled to the electrical path between the twenty fourth resistor 6117 and the collector of the thirteenth transistor T6. The base of the fourteenth transistor T7 is further coupled to a collector of the twelfth transistor T5. The emitter of the twelfth transistor T5 is connected to signal ground. One contact of a phototransistor of the second optocoupler Opto2 is connected to ground, the other contact of that phototransistor is coupled to a first output 6105 of the switch circuit 6101. The third input 6104 of the switch circuit 6101 is coupled to a GPIO1 terminal of the controller 114 and an external configuration terminal 6122 is coupled to the electrical path between the GPIO1 terminal of the controller 114 and its third output 6104. The first output 6105 of the switch circuit 6101 is coupled to a gate of a fifteenth transistor T9 and to the third output 639 of the PFC sensing cut off circuit 627. A source of the fifteenth transistor T9 is connected to ground, a drain of the fifteenth transistor T9 is coupled to a first input 6120 of the startup control circuit 633 and to the third terminal 681 of the VCC cut off circuit 678.

A gate of a seventeenth transistor T17 in the startup control circuit 633 is coupled to the first input 6120 of the startup control circuit 633. A gate of a sixteenth transistor T16 in the startup control circuit 633 is coupled to a second input 6121 of the startup control circuit 633. The second input 6121 is coupled to a GPIO0 terminal of the controller 114. A source of the seventeenth transistor T17 and a source of the sixteenth transistor T16 are connected to ground, a drain of the seventeenth transistor T17 and a drain of the sixteenth transistor T16 are coupled to a source of an eighteenth transistor T18. A gate of the eighteenth transistor T18 is coupled to the third terminal 6133 of the startup control circuit 633 via a series arrangement of an eleventh diode 6127 and a thirty first resistor 6128. The third terminal 6133 of the startup control circuit 633 is coupled to the third output 613 of the filtering circuit 603. One contact of a twelfth diode 6126 is coupled to the electrical path between the eleventh diode 6127 and the thirty first resistor 6128, the other contact is connected to ground. One contact of a tenth diode 6125, one side of a twenty first capacitor 6124 and one contact of a thirtieth resistor 6123 is coupled to the electrical path between the gate of the eighteenth transistor T18 and the eleventh diode 6127. The other contact of the tenth diode 6125, the other end of the twenty first capacitor 6124 and the other contact of the thirtieth resistor 6123 is coupled to ground. A drain of the eighteenth transistor T18 is coupled to a gate of a nineteenth transistor T19. A drain of the nineteenth transistor T19 is coupled to the first terminal 632 of the startup control circuit 633. A source of the nineteenth transistor T19 is coupled to its gate and the drain of the eighteenth transistor via a series arrangement of a thirty third resistor 6130 and a thirty second resistor 6129. A thirteenth diode 6131 is coupled between the thirty third resistor 6130 and the second terminal 676 of the startup control circuit 633.

A twenty second capacitor 6132 is coupled between ground and a VCORE terminal of the controller 114. The VCC terminal of the controller 114 is further connected to a power rail.

The above description of the converter 600 is based on an actual exemplary implementation. It should be noted that several devices of the converter circuit mentioned can be exchanged by other equivalent devices. For example, the optocoupler including a phototransistor and a light emitting diode can be replaced by any other device being able to convert an electrical input signal into a light signal and further having any kind of a photosensor for detecting the generated light. The photosensor may, upon detection of generated light, generate electric energy itself or alter the electric current flowing therethrough. Therefore, for example, the photosensor might be a be a photoresistor, a photodiode, a phototransistor, a silicon-controlled rectifier (SCR) or a triac, the device being able to convert an electrical input signal into a light signal might be a near-infrared light emitting diode (LED). In general, in various embodiments, a galvanically isolated element or galvanically isolated structure, component or device may be provided for transferring signals from one side of the converter to the other side of the converter, e.g. transformers, optocouplers, piezotransformers, coreless transformer circuits and the like.

The transistors used in the exemplary embodiment of the converter 600 include BJTs (bipolar junction transistors), whenever contacts are labelled emitter, collector and base, and MOSFETs (metal-oxide-semiconductor field-effect transistors), whenever contacts are labelled drain, source and gate. It should be noted that devices referred to as transistors in the course of the description can be replaced by equivalent switching devices that can be used to switch and/or amplify electronic signals. In the specific example of a converter 600 according to various embodiments shown in FIG. 6, the first transistor T15, the second transistor T14, the third transistor T13, the fourth transistor T12, the fifteenth transistor T9, the sixteenth transistor T16, the seventeenth transistor T17 and the eighteenth transistor T18 are formed as n-channel enrichment MOSFETs, the nineteenth transistor T19 is formed as a n-channel depletion MOSFET. The fifth transistor T11, the eleventh transistor T1, the eighth transistor T2, the twelfth transistor T5, the thirteenth transistor T6 and the fourteenth transistor T7 are formed as npn bipolar transistors. The sixth transistor T10, the seventh transistor T8, the ninth transistor T4 and the tenth transistor T3 are formed as pnp bipolar transistors.

In the following, the functionality of the converter 600 will be described. It is to be noted that the specific design of the circuit displayed in FIG. 6 is only one possible of very many embodiments and therefore it shall not be viewed as limiting concerning the general concept of the converter 100 according to various embodiments. The examples and embodiments described are for illustrative purposes only and various modifications or changes in light of the general concept of the converter 100 are to be included within the spirit of this application and scope of the appended claims.

The converter 600 can be used for converting AC voltage or DC voltage into a DC voltage. It is to be understood that by virtue of Ohm's law the voltage conversion also applies in an analogous manner to a current conversion.

In various embodiments it is assumed that the voltage to be converted is applied to the first input terminal 601 and the second input terminal 602 of the converter. As a first stage, the filtering circuit 603 is configured to provide a filtered (with respect to higher frequencies) voltage at its first output 606 and its second output 607. The filtering circuit 603 may be also configured to suppress high frequency current components which might leave the converter 600 through its first input terminal 601 and the second input terminal 602 into the AC wiring connected thereto and thereby cause interferences on other devices. The filtering circuit is an optional circuit module which can be omitted, e.g. in the case in the case when the converter 600 is used as a DC-DC converter, i.e. when filtering high frequency components of the input voltage is not required as it might be the case when DC-voltage is applied to the first input terminal 601 and the second input terminal 602.

The rectifying circuit 603 is a further optional circuit module. It is provided with four diodes in a bridge arrangement to provide the output voltage of one polarity for input voltage of both polarities. It should be noted that the rectifying circuit 614 is provided for transforming an AC voltage into a DC voltage and therefore can be omitted, for example, when the converter 600 is used as a DC-DC converter, i.e. when a DC voltage is applied to the first input terminal 601 and the second input terminal 602.

The controller 114 may be provided with a zero current detection functionality. The second winding of the second inductor 622 and the second resistor 624 coupled in series to the ZCD terminal of the controller 114 form an optional circuit module which may be used by the controller 114 to detect whether current is flowing through the first electrical path 619.

During the normal operation mode, an AC (or DC) voltage is applied to the converter 100 and subsequently filtered by the filtering circuit 603 and rectified by the rectifying circuit 614. The DC voltage is then applied to the first input 642 of the current switching circuit 643 and to the capacitor 656. The current switching circuit 643 is controlled by the controller 114 to provide a switched DC voltage at the first output 664 of the current switching circuit 643 which is then applied to the second input 659 of the transforming circuit 657. The voltage applied to the second input 659 of the transforming circuit 657 is derived from the DC voltage applied to the first input 642 of the current switching circuit 643 by means of the third transistor T13 and the fourth transistor T12 which may be switched out of phase, i.e. when one is conducting, the other one is not conducting. When the third transistor T13 is set into a conducting state, the current provided at the output 644 corresponds to the current provided to the current switching circuit 643 at its first input 642. When the fourth transistor T12 is set into a conducing state, a connection between ground and the first output 644 is established. By adjusting the switching cycle, an average value of a voltage is induced in the second and the third winding of the transformer 660 on its secondary side. This average value is the DC voltage that is provided at first and second output 667, 668 of the transforming circuit 657 an may be fed to an external load which requires a DC voltage for operation.

Upon detection of a low load (or no load) state by the load detection circuit 212 of the controller 114, a switch control signal 128 is generated and output from the GPIO1 terminal of the controller 114. The switch control signal 128 may be communicated to the first optocoupler Opto1 by applying a high potential to the lead coupling the GPIO1 terminal to one contact of the light emitting diode the first optocoupler Opto1. The resulting current flow through that light emitting diode is converted into light and detected by the phototransistor of the first optocoupler Opto1. The phototransistor is set into a conducting state and a high potential is applied the base of the eleventh transistor T1, such that is becomes conducting. The high potential, possibly reduced by voltage dividers in form of resistors, is also applied to the bases of the thirteenth transistor T6 and the fourteenth transistor T7. Due to the coupling between one contact of the phototransistor of the first optocoupler Opto1 and one contact of the light emitting diode of the second optocoupler Opto2, the high potential is also applied to the latter and a signal in the form of light is communicated to the phototransistor of the second optocoupler Opto2 which is thereby set into a conducing state.

The high potential applied to the base of the eleventh transistor T1 sets it into a conducting state, such that the base of the seventh transistor T8 is connected to signal ground via the sixteenth resistor 687 and a potential at the base of the seventh transistor T8 is lowered, whereby the seventh transistor T7 is deactivated. In effect, the control circuit 689 is deactivated and consequently transmitting of information 126 about the output voltage to the primary side circuit arrangement 112 via the third optocoupler Opto3 is stopped.

The first output 6105 of the switch circuit 6101 is connected to signal ground since the phototransistor of the second optocoupler has been set into a conducting state. The gate of the fifteenth transistor T9 is connected to ground whereby the fifteenth transistor T9 becomes isolating such that the third terminal 681 of the VCC cut off circuit 678 and the first input 6120 of the startup control circuit 633 are disconnected from ground.

The gate of the seventeenth transistor T17 being coupled to the first input 6120 of the startup control circuit 6120 is disconnected from ground and thereby reaches a higher potential and becomes conducting. It establishes a connection between ground (connected to its source) and the gate of the nineteenth transistor T19 via the eighteenth transistor T18 which acts as a comparator and is configured to compare the voltage applied to its gate with a predefined threshold, e.g. the internal gate/source threshold of the eighteenth transistor T18 (or e.g. the base/emitter threshold of the eighteenth transistor T18 in case it is implemented as a bipolar transistor). A low potential applied to the gate of the nineteenth transistor T19 sets it into a conducting state and the first electrical path 619 is effectively connected to ground via the electrical path running through the third resistor 631, the nineteenth transistor T19, the eighteenth transistor T18 and the seventeenth transistor T17. This reduces the DC voltage applied to the first input 642 of the current switching circuit.

The capacitor 677 coupled to the first terminal 679 of a VCC cut off circuit 678 which is also coupled to ground via the conducting phototransistor of the second optocoupler Opto2 may discharge. The tenth transistor T10 is activated (i.e. sets into a conducting state) by a higher potential at its base (since the fifteenth transistor disconnects the basis of the sixth transistor from ground) and in turn activates the fifth transistor T11. With the fifth transistor T11 being activated, the terminal VCC of the controller 114 is effectively connected to ground via the VCC cut off circuit 678 and the conducting phototransistor of the second optocoupler Opto2. This results in the controller 114 being cut off from the power supply such that it is deactivated.

During the deactivation period of the controller 114, the switch circuit 6101 monitors the output voltage provided at the first output 667 of the transforming circuit 657. The output voltage is supplied to the second input 6102 of the switch circuit 6101 and is scaled down before being provided to the base of the ninth transistor T4, such that a change in the output voltage of the converter 600 can alter the current flow through the ninth transistor T4. The ninth transistor T4 can alter the potential applied to the base of the twelfth transistor T5 which in turn can alter the potential applied to the base of the fourteenth transistor T7. When the voltage applied to the second input 6102 of the switch circuit 6101, corresponding to the sampled output voltage of the converter 600, is too low, the fourteenth transistor T7 may be set into a non-conducting state and hence prevent current flow through the light emitting diode of the second optocoupler Opto2. In that case the light conversion in the light emitting diode discontinues and renders the corresponding phototransistor non-conducting. Thus, the first output 6105 of the switch circuit 6101 is disconnected from ground and the process described above initiated by connecting the first output 6105 of the switch circuit 6101 to ground is reversed which results in the VCC terminal of the controller 114 to be disconnected from ground and instead properly supplied with supply voltage. This process reactivates the controller 114 which may return into normal operation mode.

FIG. 7 shows another implementation of a switch circuit 700 in accordance with various embodiments. The switch circuit 700 can be provided in the exemplary implementation of the converter 600 shown in FIG. 6 instead of the switch circuit 6101 as it is provided with equivalent inputs and outputs and has the same functionality.

The switch circuit 700 is provided with a first input 702, a second input 701, a third input 703 and a first output 704. In order to replace the switch circuit 6102 in the exemplary implementation of the converter 600 shown in FIG. 6 with the switch circuit 700, the first input 702 may be coupled to the sixteenth resistor 687, the second input 701 may be coupled to the fifth output 671 of the transforming circuit 657, the third input may be coupled to the GPIO1 terminal of the controller 114 and the external configuration terminal 6122, and the first output may be coupled to the third output 639 of the PFC sensing cut off circuit 627.

The first input 702 of the switch circuit 700 is coupled to a collector of a first transistor T1. An emitter of the first transistor T1 is connected to signal ground, a base of the first transistor T1 is coupled via a fifth resistor 705 to the electrical path between a first contact of a phototransistor of a first optocoupler Opto1 and a seventh resistor 707, which is eventually connected to signal ground. A second contact of the phototransistor of the first optocoupler Opto1 is coupled to one contact of a sixth resistor 706. The other contact of the sixth resistor 706 is coupled to a collector of a fourth transistor T6 via a ninth resistor 710, to a collector of a second transistor T4 via an second resistor 711, to the second input 701 of the switch circuit 700 and to a first contact of a light emitting diode of a second optocoupler Opto2 via an eighth resistor 708. A second contact of the light emitting diode of the second optocoupler Opto2 is coupled to a collector of a fifth transistor T7. An emitter of the fifth transistor T7 is coupled to signal ground, a base of the fifth transistor T7 is coupled to the electrical path between the ninth resistor 710 and the collector of the fourth transistor T6 and to the collector of a third transistor T5. An emitter of the fourth transistor T6 is connected to signal ground, a base of the fourth transistor T6 is coupled via a third resistor 709 to the electrical path between the fifth resistor 705 and the seventh resistor 707. An emitter of the third transistor T5 is coupled to signal ground, a base of the third transistor T5 is coupled to the electrical path between the second resistor 711 and the collector of a second transistor T4. An emitter of the second transistor T4 is connected to signal ground, a base of the second transistor T4 is connected to signal ground via a first resistor 713. The base of the second transistor T4 is further coupled to the second input 701 of the switch circuit 700 via a first diode 712. One contact of a light emitting diode included in the first optocoupler Opto1 is coupled to the third input 703 of the switch circuit, the other contact is connected to ground. A first contact of a phototransistor included in the second optocoupler Opto2 is connected to ground, the other contact is coupled to the first output 704 of the switch circuit 700.

In the specific example of the switch circuit 700 according to various embodiments shown in FIG. 7, all five transistors (first transistor T1 through fifth transistor T7) are formed as npn bipolar transistors.

FIG. 8 shows another implementation of a switch circuit 800 in accordance with various embodiments. The switch circuit 800 can be provided in the exemplary implementation of the converter 600 shown in FIG. 6 instead of the switch circuit 6101 as it is provided with equivalent inputs and outputs and has the same functionality.

The switch circuit 800 is provided with a first input 802, a second input 801, a third input 803 and a first output 804. In order to replace the switch circuit 6102 in the exemplary implementation of the converter 600 shown in FIG. 6 with the switch circuit 800, the first input 802 may be coupled to the sixteenth resistor 687, the second input 801 may be coupled to the fifth output 671 of the transforming circuit 657, the third input may be coupled to the GPIO1 terminal of the controller 114 and the external configuration terminal 6122, and the first output may be coupled to the third output 639 of the PFC sensing cut off circuit 627.

The first input 802 of the switch circuit 800 is coupled to a collector of a first transistor T1. An emitter of the first transistor T1 is connected to signal ground, a base of the first transistor T1 is coupled via a seventh resistor 805 to the electrical path between a first contact of a phototransistor of a first optocoupler Opto1 and a sixth resistor 807, which is eventually connected to signal ground. A second contact of the phototransistor of the first optocoupler Opto1 is coupled to one contact of a eighth resistor 806. The other contact of the eighth resistor 806 is coupled to a collector of a fourth transistor T6 via a fourth resistor 810, to the second input 801 of the switch circuit 800 and to a first contact of a light emitting diode of a second optocoupler Opto2 via a fifth resistor 808. A second contact of the light emitting diode of the second optocoupler Opto2 is coupled to a collector of a third transistor T7. An emitter of the third transistor T7 is coupled to signal ground, a base of the third transistor T7 is coupled to the electrical path between the fourth resistor 810 and the collector of the second transistor T6 and is further coupled via a second resistor 811 to one side of a first capacitor 814 and to one contact of a first resistor 813. The other side of the capacitor 814 and the other contact of the first resistor 813 are both connected to signal ground. An emitter of the second transistor T6 is connected to signal ground, a base of the second transistor T6 is coupled via a third resistor 809 to the electrical path between the seventh resistor 805 and the sixth resistor 807. The contact of the first capacitor 814 not connected to signal ground and the contact of the first resistor 813 not connected to signal ground are further coupled to the second input 801 via a first diode 812. One contact of a light emitting diode included in the first optocoupler Opto1 is coupled to the third input 803 of the switch circuit, the other contact is connected to ground. A first contact of a phototransistor included in the second optocoupler Opto2 is connected to ground, the other contact is coupled to the first output 704 of the switch circuit 800.

In the specific example of the switch circuit 800 according to various embodiments shown in FIG. 8, all three transistors (first transistor T1 through third transistor T7) are formed as npn bipolar transistors.

Figure 9A:
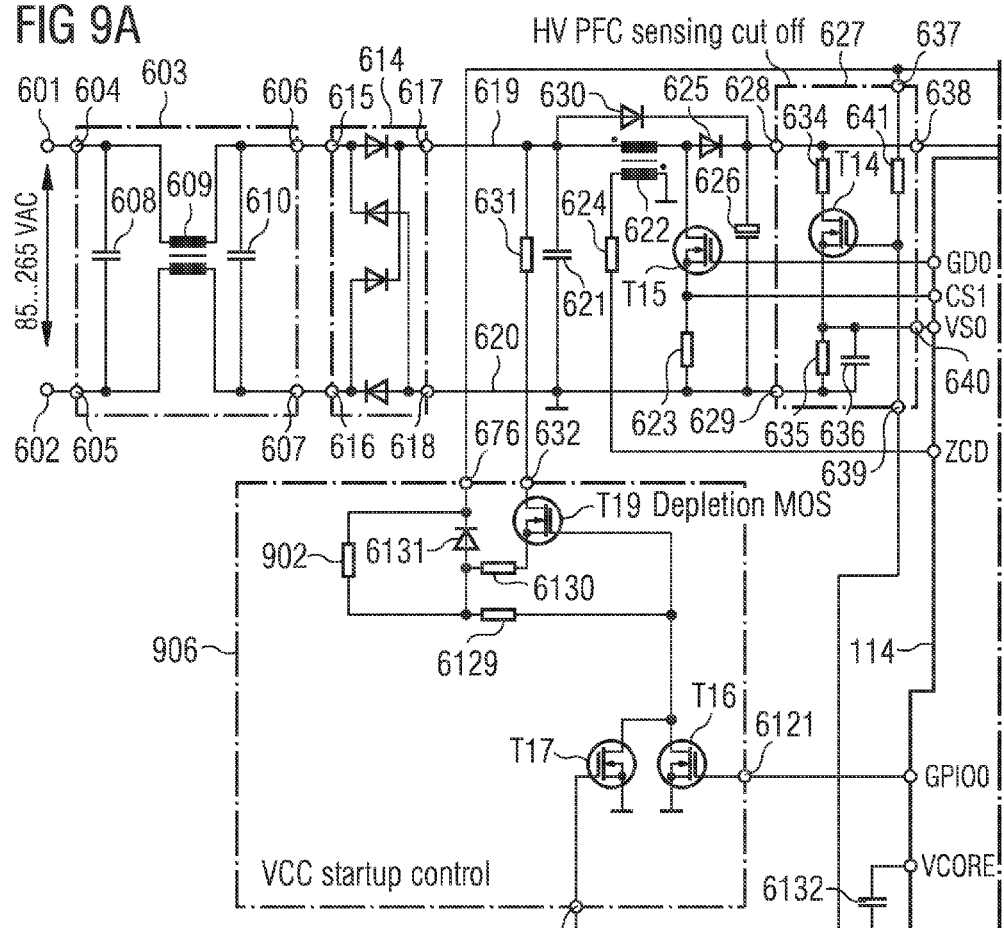
FIGS. 9, 9A, and 9B show another implementation of the converter shown in FIG. 1 in accordance with various embodiments.
Figure 9:
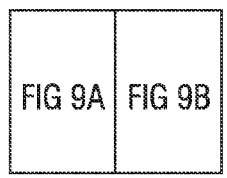
Figure 9B:
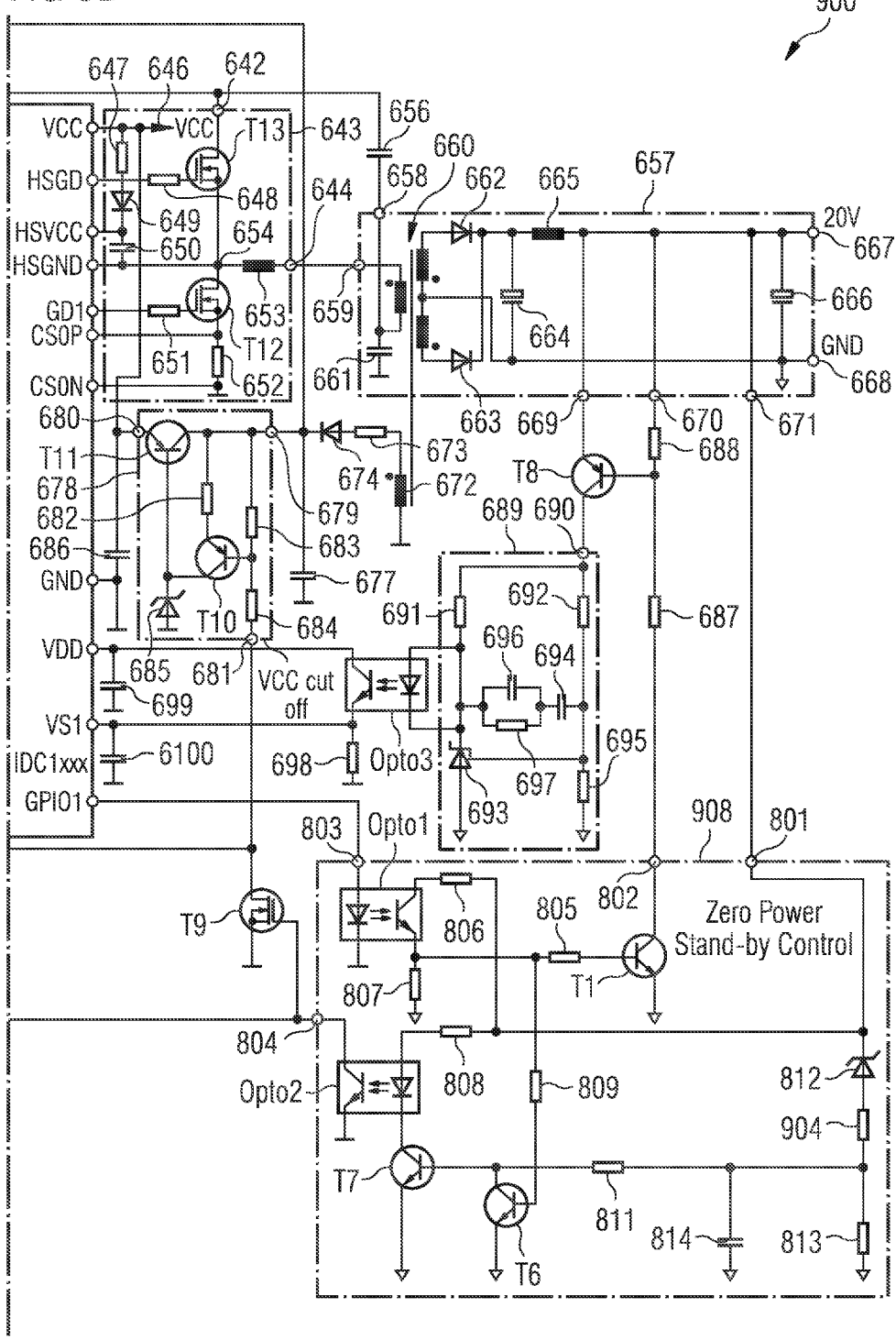

Another implementation of the converter shown in FIG. 1 in accordance with various embodiments is shown in FIG. 9. The layout of the converter 900 in FIG. 9 is based on the general layout of the implementation of the converter 600 shown in FIG. 6. However, in comparison to the startup control circuit 633 in the converter 600 in FIG. 6, the converter 900 features a modified startup control circuit 906 in a sense that the thirty first resistor 6128, the eleventh diode 6127, the twelfth diode 6126, the tenth diode 6125, the twenty first capacitor 6124, the thirtieth resistor 6123 and the eighteenth transistor T18 are not provided. Those components are responsible for initiating a discharge process for the so-called "x capacitors" or X-caps which may include for example capacitors 212 and 236. This functionality is optional and may be omitted in the startup control circuit 906 of the converter 900. The eighteenth transistor T18 in the startup control circuit 633 of the converter 600 in FIG. 6 which is omitted here is bridged such that the drain of the seventeenth transistor T17 and the drain of the sixteenth transistor T16 are coupled to the gate of the nineteenth transistor T19. An additional resistor 902 is provided in parallel to the thirteenth diode 6131. Apart from the described differences, the startup control circuit 906 corresponds to the startup control circuit 633 of the converter 600 in FIG. 6.

Due to the omission of electronic components within the startup control circuit 906 which may be provided in order to initiate a discharge of the X-caps, the third output 613, the third capacitor 611 and the fourth capacitor 612 in the filtering circuit 603 of the converter 600 may be omitted in the the filtering circuit 603 of the converter 900 in FIG. 9.

The switch circuit 908 provided in the converter 900 in FIG. 9 is based on the implementation of the switch circuit 800 shown in FIG. 8. However, the switch circuit 908 is slightly modified with respect to the switch circuit 800 shown in FIG. 8 such that the fourth resistor 810 is omitted and an additional resistor 904 is provided between the diode 812 and the first resistor 813.

It is to be noted that apart from the structural differences that have been described between the implementation of the converter 600 in FIG. 6 according to various embodiments and the implementation of the converter 900 in FIG. 9 according to various embodiments, characteristic values of one or more electronic components such as resistances of resistors and/or capacitances of capacitors may be different as well. Notwithstanding those modifications, the fundamental idea of operation of the implementation of the converter 900 in FIG. 9 according to various embodiments corresponds to that of the implementation of the converter 600 in FIG. 6 according to various embodiments and therefore will not be repeated here.

Figure 10B:
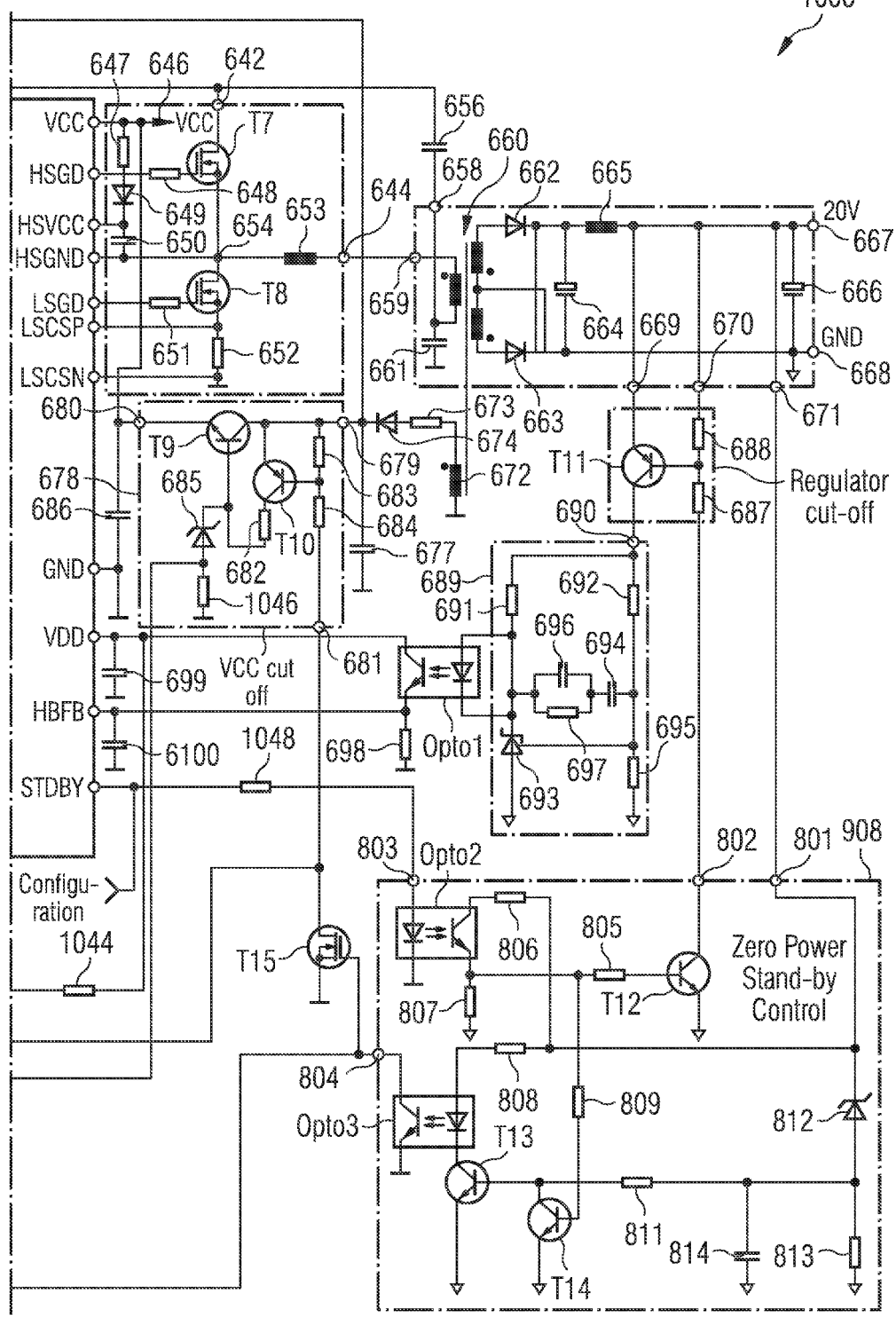

A further implementation of the converter shown in FIG. 1 in accordance with various embodiments is shown in FIG. 10. The layout of the converter 1000 in FIG. 10 is based on the general layout of the implementation of the converter 600 shown in FIG. 6. However, some adjustments have been made and will be described in the following without describing unchanged corresponding components and/or their structural interconnections again.

In comparison to the converter 600 shown in FIG. 6, the startup control circuit 1001 in the converter 1000 shown in FIG. 10 features a modified charge pump which is configured as a symmetrical charge pump. The third capacitor 611 and the fourth capacitor 612 are omitted in the filtering circuit 603. Instead, the third output 613 of the filtering circuit 603 is coupled to the first electrical path 619 and additionally a fourth output 1002 is provided which is coupled to the second electrical path 620. Moreover, the third resistor 631 which is present in the converter 600 of FIG. 6 between the first electrical path 619 and the second electrical path 620 has been omitted in this embodiment.

The third output 613 of the filtering circuit 603 is coupled to the third terminal 6133 of the startup control circuit 1001 which is based on the startup control circuit 633 shown in FIG. 6. The fourth output 1002 of the filtering circuit 603 is coupled to a fourth input 1004 of the startup control circuit 1001 which is added with respect to the startup control circuit 633 shown in FIG. 6. The third terminal 6133 of the startup control circuit 1001 is coupled to ground via a series arrangement of a thirty fourth resistor 1006, a twenty third capacitor 1008 and a fourteenth diode 1012. One contact of a fifteenth diode 1010 is coupled to the electrical path between the twenty third capacitor 1008 and the fourteenth diode 1012 and its other contact is coupled to the twenty first capacitor 6124. The fourth input 1004 of the startup control circuit 1001 is coupled to ground in the same manner, i.e. via a series arrangement of a thirty fifth resistor 1014, a twenty fourth capacitor 1016 and a sixteenth diode 1020. One contact of a seventeenth diode 1018 is coupled to the electrical path between the twenty fourth capacitor 1016 and the sixteenth diode 1020 and its other contact is coupled to the twenty first capacitor 6124. In comparison to the startup control circuit 633 of the converter 600 shown in FIG. 6, in the startup control circuit 1001 of the converter 1000 of FIG. 10 the thirteenth diode 6131 has been omitted, a thirty sixth resistor 1022 has been added, arranged between the gate of the third transistor T3 and the gate of the fourth transistor T4, and a diode 1023 has been added, wherein its one contact is coupled to the electrical path between the thirty third resistor 6130 and the thirty second resistor 6129 and its other contact is coupled to ground. All other electronic components of the startup control circuit 1001 functionally correspond to those within the startup control circuit 633 of the converter 600 in FIG. 6. The second input 6121 of the startup control circuit 1001, instead of being directly coupled to the terminal GPI0 of the controller 114 (as it is the case in the converter 600 shown in FIG. 6) is coupled to a terminal START of the controller 114 via a forty first resistor 1024, wherein the terminal START corresponds to the terminal GPI0 of the controller 114 in the converter 600 shown in FIG. 6.

The converter 1000 shown in FIG. 10 has been supplemented by an optional undervoltage lockout circuit 1026. The undervoltage lockout circuit 1026 may primarily include three transistors. A drain of a twentieth transistor 1030, which may be of an enrichment MOSFET type, is coupled to a terminal ICEN of the controller 114. A twenty sixth capacitor 1028 is coupled between the drain of the twentieth transistor 1030 and the ground. A source of the twentieth transistor 1030 is also coupled to ground. The gate of the twentieth transistor 1030 is coupled to a first output 1034 of the undervoltage control circuit 1026. The terminal ICEN of the controller 114 is further coupled to a collector of a twenty second transistor 1032, which may be of a bipolar npn type, and to a collector of a twenty first transistor 1033, which may be of a bipolar npn type. An emitters of each of the twenty first transistor 1033 and the twenty second transistor 1032 is coupled to ground. The base of the twenty second transistor 1032 is coupled to a second input 1036 of the undervoltage lockout circuit 1026 and the base of the twenty first transistor 1033 is coupled to a third input 1038 of the undervoltage lockout circuit 1026.

The first input 1034 of the undervoltage lockout circuit 1026 is coupled to the first input 6120 of the startup control circuit 1001. In addition, the first input 6120 of the startup control circuit 1001 is coupled to ground via a twenty fifth capacitor 1042. The second input 1036 of the undervoltage lockout circuit 1026 is coupled to the terminal VDD of the controller 114 via a thirty eighth resistor 1044. Last but not least, the third input 1038 of the undervoltage lockout circuit 1026 is coupled to the electrical path between the seventh diode 685 and an (with respect to the VCC cut off circuit 678 of the converter 600 shown in FIG. 6) added fortieth resistor 1046 in the VCC cut off circuit 678, wherein the fortieth resistor 1046 is coupled between ground and the seventh diode 685.

The switch circuit 908 provided in the converter 1000 shown in FIG. 10 corresponds to the switch circuit 908 in the converter 900 shown in FIG. 9, only that the additional resistor 904 provided there has been omitted in this embodiment.

A thirty seventh resistor 1040 has been provided in the electrical path between the drain of the fifteenth transistor T15 and the first input 6120 of the startup control circuit 1001. A thirty ninth resistor 1048 has been provided in the electrical path between the third input 803 of the switch circuit 908 and a terminal STDBY of the controller 114 in the converter 1000 shown in FIG. 10, wherein the terminal STDBY corresponds to the GPIO1 terminal of the controller 114 in the converter 600 shown in FIG. 6.

With regard to the converter 1000 shown in FIG. 10, only differences with respect to the converter 600 shown in FIG. 6 or the switch circuit 908 of the converter 900 shown in FIG. 9 have been described, apart from which the functional parts of the converter 1000 correspond to those of the converter 600 shown in FIG. 6, with the switch circuit 908 corresponding to the switch circuit 908 of the converter 900 shown in FIG. 9. It is to be noted though that apart from the structural differences that have been described between the implementation of the converter 1000 in FIG. 10 according to various embodiments and the implementations shown in FIG. 6 and/or FIG. 9 according to various embodiments, characteristic values of one or more electronic components such as resistances of resistors and/or capacitances of capacitors may be different as well. Notwithstanding those modifications, the fundamental idea of operation of the implementation of the converter 1000 shown in FIG. 10 according to various embodiments corresponds to that of the implementation of the converter 600 in FIG. 6 and/or the implementation of the converter 900 shown in FIG. 9 according to various embodiments. At this point it should be emphasized that the various exemplary embodiments (see FIG. 6, FIG. 9 and FIG. 10) offer a highly modular layout such that individual modules, e.g. the switch circuit 6101, can be adapted in various ways or individual modules, e.g. the undervoltage lockout circuit 1026, can be implemented or omitted in order to optimize the converter according to various embodiments for its use in various environments.

In the following, the process sequences that take place within the converter according to various embodiments during entering and leaving a power saving operation mode when a no load state is detected shall be explained, based on the embodiment of the converter 1000 shown in FIG. 10.

In order to achieve a very low no load stand-by power consumption, e.g. below 30 mW, the converter according to various embodiments may use the AC/DC controller 114 which based on a signal provided from the secondary side 110 of the power stage 106 is able to detect the no load state. Upon detection of the no load state, as already explained on the basis of the flow diagram shown in FIG. 3, a dedicated signal is provided by the controller, e.g. at the terminal STDBY of the controller 114 of the converter 1000 shown in FIG. 10, which initiates a stand-by power saving mode or a special burst mode. During the stand-by power saving mode the current consumption on the primary side and on the secondary side of the converter is minimized by switching off the majority of the circuitry on the primary side and the secondary side of the converter in order to achieve a very low stand-by power consumption. During the stand-by power saving mode only very small currents for wake up or start up circuitry on the primary side and the secondary side are used.

Figure 11A:
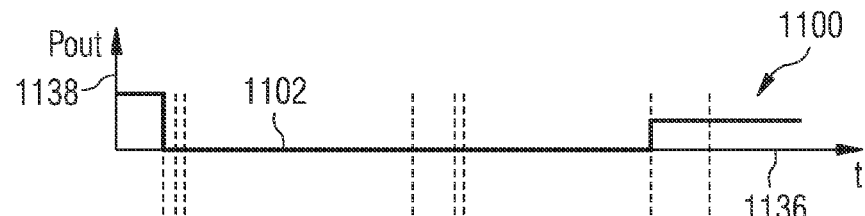
FIG. 11A through FIG. 11I show signal sequences at various interfaces within the converter according to various embodiments.
Figure 11B:
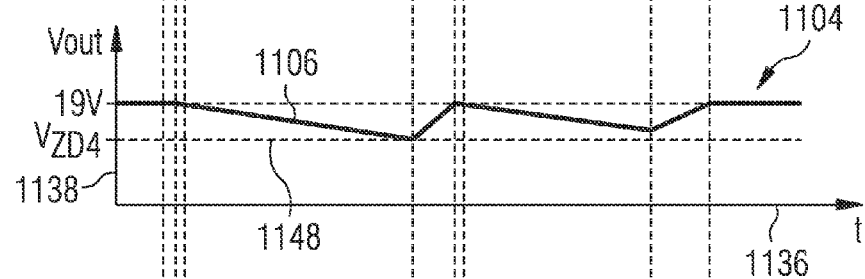
Figure 11C:
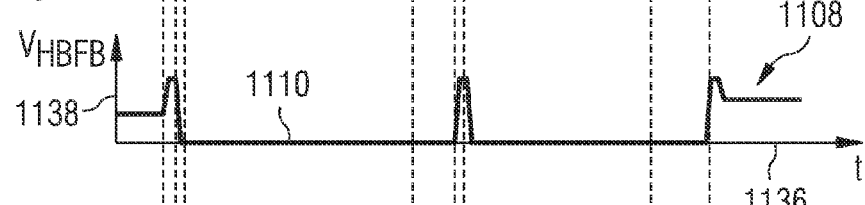
Figure 11D:
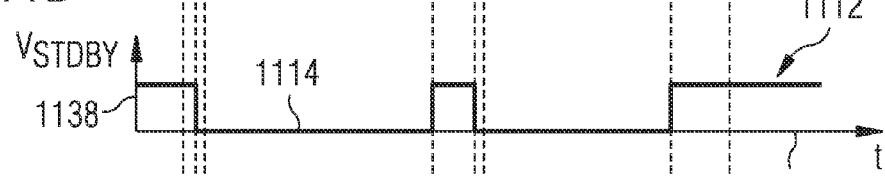
Figure 11E:
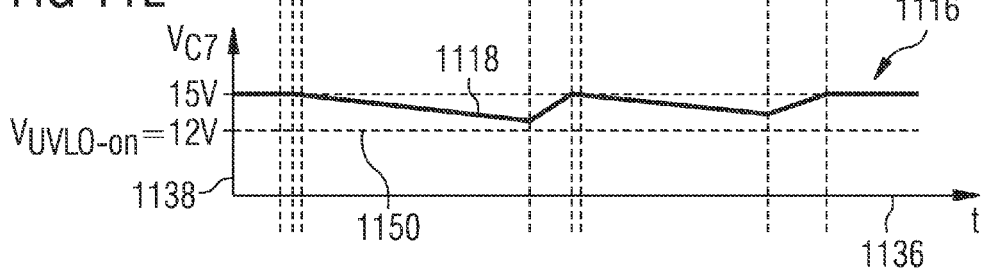
Figure 11F:
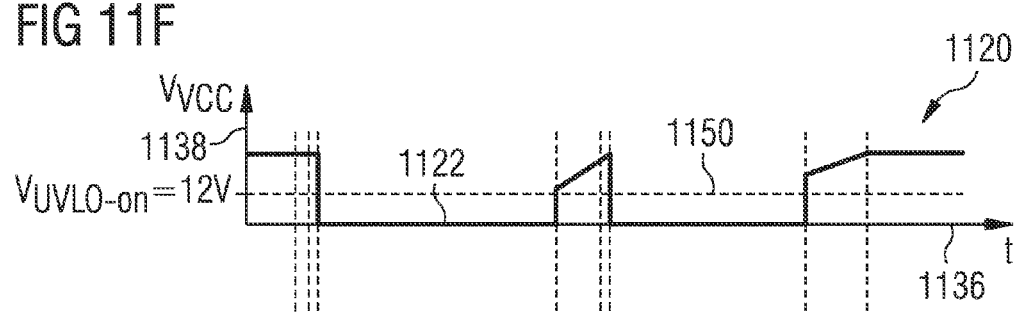
Figure 11G:
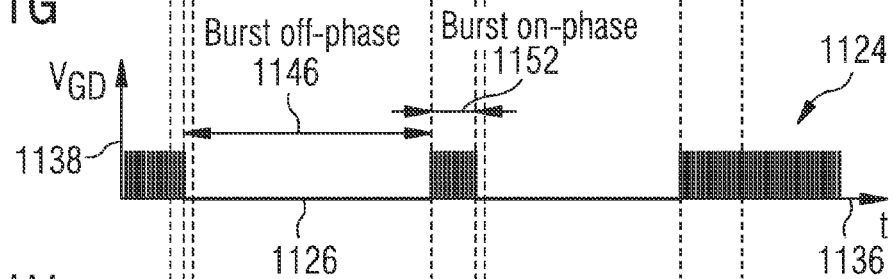
Figure 11H:
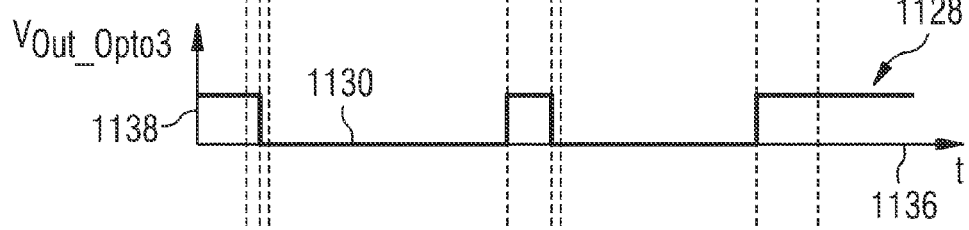
Figure 11I:
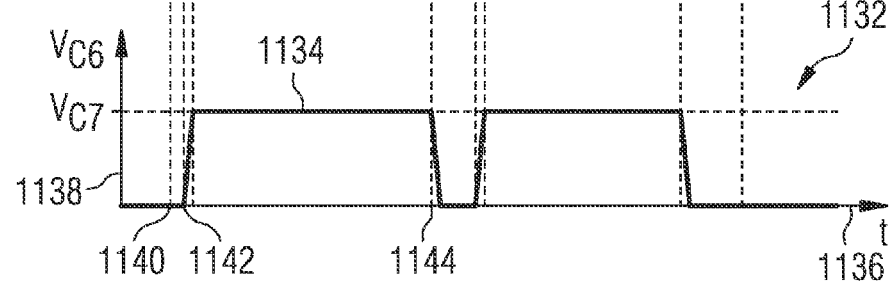

Exemplary signal sequences at various interfaces within the converter 1000 during entering and leaving the stand-by power saving operation mode or the burst-mode are shown in FIG. 11A through FIG. 11I. A representation 1102 of the output power provided at the first output 667 and the second output 668 of the converter 1000 is shown in diagram 1100 of FIG. 11A. A representation 1106 of the output voltage provided at the first output 667 and the second output 668 of the converter 1000 is shown in diagram 1104 of FIG. 11B. A representation 1110 of the signal containing information about the output voltage and/or the output current (feedback signal hereinafter) which is provided at the terminal HBFB of the controller 114 by the means of the third optocoupler Opto3 is shown in diagram 1108 of FIG. 11C. A representation 1114 of the signal provided by the controller 114 at the terminal STDBY corresponding to the switch control signal 128 (see FIG. 1) is shown in diagram 1112 of FIG. 11D. A representation 1118 of the voltage across the thirteenth capacitor 677 on the secondary side of the converter 1000 is shown in diagram 1116 of FIG. 11E. A representation 1122 of the voltage at the terminal VCC of the converter 1000, being the power supply terminal of the controller 114, is shown in diagram 1120 of FIG. 11F. A representation 1126 of the signal provided at any of the terminal HSGD or the terminal LSGD of the converter 1000 is shown in diagram 1124 of FIG. 11G. A representation 1130 of the output voltage of the third optocoupler Opto3 within the switch circuit 908 of the converter 1000 is shown in diagram 1128 of FIG. 11H. A representation 1134 of the voltage across the twenty fifth capacitor 1042 of the converter 1000 is shown in diagram 1132 of FIG. 11I. In each of the diagrams shown in FIG. 11A through FIG. 11B, the x-axis 1136 represent time. An actual scaling of the x-axes 204 is omitted, however, distinct times or time intervals which will be referred to in the following are marked or are bound by perpendicular lines intersecting the x-axes. The y-axis 1138 in each of the diagrams shown in FIG. 11A through FIG. 11B represents an amplitude of the various signals shown in the diagrams, wherein with the exception of the y-axis 1138 in the diagram 1100 of FIG. 11A relating to power all the other y-axes 1136 in the diagrams of FIG. 11B through FIG. 11I relate to a voltage. The x-axis 1136 in each of the diagrams marks the zero value level of the amplitude for the signal shown in a respective diagram. An actual scaling of the y-axes 1138 is also omitted.

As explained with regard to the flow diagram shown in FIG. 3, the stand-by power saving operation mode or burst-off phase 1146 is initiated when the controller 114 has detected the no load state. When a load is disconnected from the converter 1000 at a first time 1140, the output power 1102 in diagram 1100 of FIG. 11A drops to zero due to the interrupted current flow from the converter 1000 to the load. The controller 114 monitors the voltage 1110 which corresponds to a feedback signal provided at the terminal HBFB by the first optocoupler Opto1. From the feedback signal 1110 the load condition may be determined. Once the no load condition is detected, e.g. due to the amplitude of the feedback signal 1100 exceeding a predefined voltage threshold at the terminal HBFB of the controller 114, the switch control signal 1114 at the terminal STDBY of the controller 114 is switched from its high level to its low level at a second time 1142. Simultaneously, the signal 1126 provided at any of the terminal HSGD or the terminal LSGD is turned off (i.e. acquire a zero value) such that the current switching circuit 643 discontinues its operation and the output voltage 1106 begins to drop. Due to the low level of the switch control signal 1114 at the terminal STDBY, the second optocoupler Opto2 in the switch circuit 908 is deactivated thus deactivating or switching off the twelfth transistor T12 within the switch circuit 908 of the converter 1000. This in turn results in the eleventh transistor T11 being switched off which deactivates the control circuit 689, which is supplied by the eleventh transistor T11. The low level of the switch control signal 1114 at the terminal STDBY also leads to a deactivation of the fourteenth transistor T14 within the switch circuit 908. Thereby the base of the thirteenth transistor T13 can be brought to a higher potential by means of the first resistor 813 within the switch circuit 908. The potential 1130 (see diagram 1128 of FIG. 11H) at the third optocoupler Opto3 within the switch circuit 908 is pulled to ground whereby the gate of the fifteenth transistor T15 is pulled to ground which in effect deactivates the primary side of the converter 1000. The startup control circuit 1001, for example, remains switched off by the fifth transistor T5 to avoid a lossy charge up from the voltage provided a first input terminal 601 and a second input terminal 602 of the converter 1000. In addition, the VCC cut off circuit 678 disconnects the controller 114 from the thirteenth capacitor 677 which starting at the second time 1142 is discharged via the sixth resistor 641 arranged in the PFC sensing cut off circuit 627 and the third optocoupler Opto3, its voltage 1118 slowly dropping as can be seen in diagram 1116 of FIG. 11E.

The second time 1142 marks the beginning of the stand-by power saving operation mode or burst off phase 1146 during which there is no load connected to the converter 1000 and during which several circuit modules remain switched off in order to reduce the power consumption of the converter 1000 to a minimum. One main precondition to achieve this target is the permission of a large output voltage drop during the no load condition (see drop of output voltage 1106 in diagram 1104 of FIG. 11B during the burst off phase), i.e. when the converter 1000 remains in stand-by power saving mode 1146. The level of this output voltage drop has a significant impact on the achievable no load stand-by power consumption. It determines the time for the burst off phase 1146 with lowest current consumption. A larger drop increases the off-phase 1146 during this burst mode thereby further reducing the average no load stand-by power, wherein a voltage output drop of e.g. 4V (with possible output voltage values ranging between 15V and 19V, for example) or more may be aimed at. Furthermore, the standard X-cap discharge resistors that are usually connected in parallel to the input EMI filter must be removed and can be replaced, for example, by the shown startup control circuit 1001 including the X-cap discharge functionality which was already described above. During the burst off phase 1146 several modules remain cut off or deactivated on the primary side and the secondary side of the converter 1000 that would otherwise consume a static current. The cut off on the primary side of the converter 1000 is controlled by the switch circuit 908 on the secondary side, via the third optocoupler Opto3, and the fifteenth transistor T15 as was described above, whereas the cut off on the secondary side is controlled by the twelfth transistor T12.

Once the burst off phase 1146 is entered at the second time 1142, the output voltage 1106 (see diagram 1104 of FIG. 11B) starts to fall. If the output voltage 1106 undershoots a clamping voltage 1148 of the first diode 812 provided in the switch circuit 908, the thirteenth transistor T13 is switched off and therefore also the third optocoupler Opto3 is switched off. This can be observed at a third time 1144 in diagram 1104 of FIG. 11B. Since the gate of the fifteenth transistor T15 is then disconnected from ground, the pull up current at the output of the third optocoupler Opto3 provided at the gate of the fifteenth transistor T15 can switch on the fifteenth transistor T15. This results in an immediate activation or turning on of the controller 114 by connecting the still charged the thirteenth capacitor 677 to the terminal VCC of the controller 114 via the VCC cut off circuit 678 where the tenth capacitor T10 and the ninth capacitor T9 are now activated. At the same time the twenty fifth capacitor 1042 is discharged via the thirty seventh resistor 1040, such that the voltage 1134 across the twenty fifth capacitor 1042 drops as can be seen in diagram 1132 of FIG. 11I, beginning at the third time 1144. When the supply pin terminal VCC of the controller 114 is connected to the thirteenth capacitor 677, the sixteenth transistor T16 within the undervoltage lockout circuit 1026 will be kept switched on to support an immediate activation of the controller 114 if the voltage at the terminal VCC is higher than an internal on-threshold 1150 which in this exemplary embodiment is set at 12V. Once the controller 114 is enabled, the seventeenth transistor T17 will be switched on by the signal provided at the terminal VDD of the controller 114 in order to connect the terminal ICEN to ground such that the activation of the controller 114 is further supported. After having initiated a burst on phase 1152 at the third time 144, an initial starting process of the converter 114 or soft-start takes place. As can be seen in the diagrams shown in FIG. 11A through FIG. 11I, the time span between the second time 1142 and the third time 1144 defines the stand-by power saving mode or the burst off phase 1146.

In various embodiments a converter is provided. The converter may include a transformer; a first circuit arrangement coupled to a first side of the transformer; a second circuit arrangement coupled to a second side of the transformer, the second side being galvanically separated from the first side, wherein the second circuit arrangement is coupled to an output and is configured to provide an output voltage at the output; wherein the first circuit arrangement and the second circuit arrangement are galvanically separated from each other; a first coupler coupled to the first circuit arrangement and configured to provide information about the output voltage to the first circuit arrangement; wherein the first circuit arrangement is configured to determine a state of the secondary side based on the received information about the output voltage, and to generate a switch control signal dependent on the determined state; a switch circuit arranged on the second side; and a second coupler coupled to the first circuit arrangement and to the switch circuit, and configured to provide a switch control signal from the first circuit arrangement to the switch circuit; wherein the switch circuit is coupled to the first circuit arrangement to provide a first circuit arrangement control signal to the first circuit arrangement depending on the switch control signal.

In an implementation of these embodiments, the converter may be configured as an isolated switched mode power supply.

In another implementation of these embodiments the converter may be configured as a forward converter or as a reverse converter.

In yet another implementation of these embodiments, the converter may be configured as a converter selected from a group of converters including a boost converter; buck converter; boost/buck converter; and flyback converter.

In yet another implementation of these embodiments, the converter may be configured as a half-bridge converter or as a full-bridge converter.

In yet another implementation of these embodiments, the converter may be configured as a switch mode power supply converter.

In yet another implementation of these embodiments, the first circuit arrangement may include a controller configured to control the current flow through the first side of the transformer.

In yet another implementation of these embodiments, the converter may further include at least one switch coupled to the controller and the first side of the transformer such that it determines current flow through the first side of the transformer depending on a switch control signal provided by the controller.

In yet another implementation of these embodiments, the at least one switch may include at least one transistor, e.g. at least one power transistor, e.g. a field effect transistor, e.g. a metal oxide semiconductor (MOS) field effect transistor, e.g. a power metal oxide semiconductor (MOS) field effect transistor, e.g. a DMOS field effect transistor or a UMOS field effect transistor.

In yet another implementation of these embodiments, the controller may include a modulation circuit configured to provide at least one switch control signal to the at least one switch.

In yet another implementation of these embodiments, the modulation circuit may be configured as a pulse width modulation circuit or as a pulse frequency modulation circuit.

In yet another implementation of these embodiments, the controller may include a power management circuit configured to provide power management for the controller.

In yet another implementation of these embodiments, the controller may include a current limiting circuit.

In yet another implementation of these embodiments, the controller may include a plurality of discrete circuit components (which may be mounted on a printed circuit board, for example) or is configured as a programmable controller (which may be monolithically integrated on a wafer substrate) such as e.g. a microcontroller (e.g. a reduced instruction set computer (RISC) microcontroller or a complex instruction set computer (CISC) microcontroller), or a field programmable gate array (FPGA), or a programmable logic array (PLA) or any other kind of logic circuit.

In yet another implementation of these embodiments, the first circuit arrangement may further include a controller startup circuit configured to provide controller startup signal depending on the output voltage provided at the second side.

In yet another implementation of these embodiments, the controller may include the controller startup circuit.

In yet another implementation of these embodiments, the first circuit arrangement may further include a zero current detection circuit configured to detect the current flowing on the first side of the transformer.

In yet another implementation of these embodiments, the zero current detection circuit may be configured to inductively detect the current flowing on the first side of the transformer.

In yet another implementation of these embodiments, at least one of the first coupler and the second coupler may be configured to provide a transmission of a signal via a galvanic separation between the first circuit arrangement and the second circuit arrangement.

In yet another implementation of these embodiments, at least one of the first coupler and the second coupler may include an optocoupler.

In yet another implementation of these embodiments, the first circuit arrangement may be configured to determine a state in which the output power is lower than a predefined threshold power as the determined state which may be referred to as low load state or even no load (or zero load) state, illustratively representing a state in which substantially no load is coupled to the output of the converter.

In yet another implementation of these embodiments, the switch circuit may be coupled to the first circuit arrangement via the first coupler.

In yet another implementation of these embodiments, the converter may further include: a third coupler coupled to the first circuit arrangement and to the switch circuit; wherein the switch circuit is coupled to the first circuit arrangement via the third coupler.

In yet another implementation of these embodiments, the third coupler may be configured to provide a transmission of a signal via a galvanic separation between the first circuit arrangement and the second circuit arrangement.

In yet another implementation of these embodiments, the third coupler may include an optocoupler.

In yet another implementation of these embodiments, the second circuit arrangement may include a further switch configured to control the current flow through the first coupling component depending on the switch control signal provided by the second coupler.

In various embodiments, a converter is provided. The converter may include a transformer comprising a primary winding and a secondary winding being galvanically separated from each other; a first circuit arrangement coupled to the primary winding; a second circuit arrangement coupled to the secondary winding, wherein the second circuit arrangement is connected to an output terminal to provide an output voltage to a load connected to the output terminal; a first coupler configured to transmit information representing the output voltage to the first circuit arrangement; wherein the first circuit arrangement is configured to determine a state of the secondary side based on the received information, and to generate a switch control signal dependent on the determined state; a switch circuit coupled to the second winding; and a second coupler coupled to the first circuit arrangement and to the switch circuit, and configured to provide a switch control signal from the first circuit arrangement to the switch circuit; wherein the switch circuit is non-galvanically coupled to the first circuit arrangement to provide a first circuit arrangement control signal to the first circuit arrangement depending on the switch control signal.

In an implementation of these embodiments, the converter may be configured as an isolated switched mode power supply.

In another implementation of these embodiments, the converter the converter may be configured as a forward converter or as a reverse converter.

In yet another implementation of these embodiments, the converter may be configured as a converter selected from a group of converters consisting of: boost converter; buck converter; boost/buck converter; and flyback converter.

In yet another implementation of these embodiments, the converter may be configured as a half-bridge converter or as a full-bridge converter.

In yet another implementation of these embodiments, the converter may be configured as a switch mode power supply converter.

In yet another implementation of these embodiments, the first circuit arrangement may include a controller configured to control the current flow through the primary winding.

In yet another implementation of these embodiments, the converter may further include: at least one switch coupled to the controller and the primary winding such that it determines current flow through the primary winding depending on a switch control signal provided by the controller.

In yet another implementation of these embodiments, the at least one switch may include at least one transistor, e.g. at least one power transistor, e.g. a field effect transistor, e.g. a metal oxide semiconductor (MOS) field effect transistor, e.g. a power metal oxide semiconductor (MOS) field effect transistor, e.g. a DMOS field effect transistor or a UMOS field effect transistor.

In yet another implementation of these embodiments, the controller may include a modulation circuit configured to provide at least one switch control signal to the at least one switch.

The converter of claim 10, wherein the modulation circuit may be configured as a pulse width modulation circuit or as a pulse frequency modulation circuit.

In yet another implementation of these embodiments, the controller may include a power management circuit configured to provide power management for the controller.

In yet another implementation of these embodiments, the controller may include a current limiting circuit.

In yet another implementation of these embodiments, the controller may include a plurality of discrete circuit components (which may be mounted on a printed circuit board, for example) or is configured as a programmable controller (which may be monolithically integrated on a wafer substrate) such as e.g. a microcontroller (e.g. a reduced instruction set computer (RISC) microcontroller or a complex instruction set computer (CISC) microcontroller), or a field programmable gate array (FPGA), or a programmable logic array (PLA) or any other kind of logic circuit.

In yet another implementation of these embodiments, the first circuit arrangement may further include a controller startup circuit configured to provide controller startup signal depending on the output voltage provided at the secondary winding.

In yet another implementation of these embodiments, the controller may contain the controller startup circuit.

In yet another implementation of these embodiments, the primary side circuit arrangement may further include a zero current detection circuit configured to detect the current flowing on the primary winding.

In yet another implementation of these embodiments, the zero current detection circuit may be configured to inductively detect the current flowing on the primary winding.

In yet another implementation of these embodiments, at least one of the first coupler and the second coupler may be configured to provide a transmission of a signal via a galvanic separation between the first circuit arrangement and the second circuit arrangement.

In yet another implementation of these embodiments, at least one of the first coupler and the second coupler may include an optocoupler.

In yet another implementation of these embodiments, the first circuit arrangement may be configured to determine a state in which the output power is lower than a predefined threshold power as the determined state (which may be referred to as low load state or even no load (or zero load) state, illustratively representing a state in which substantially no load is coupled to the output of the converter).

In yet another implementation of these embodiments, the switch circuit may be coupled to the first circuit arrangement via the first coupler.

In yet another implementation of these embodiments, the converter may further include: a third coupler coupled to the primary side circuit arrangement and to the switch circuit; wherein the switch circuit is coupled to the primary side circuit arrangement via the third coupler.

In yet another implementation of these embodiments, the third coupler may be configured to provide a transmission of a signal via a galvanic separation between the first circuit arrangement and the second circuit arrangement.

In yet another implementation of these embodiments, the third coupler may include an optocoupler.

In yet another implementation of these embodiments, the second circuit arrangement may include a further switch configured to controller the current flow through the first coupling component depending on the switch control signal provided by the second coupling component.

The converter according to various embodiments can be used in a wide variety of applications, for example as a voltage and/or current converter for notebooks, netbook, PDAs (personal digital assistant) and various other electronic devices which may require a power converter in the range from 90 W to 120 W.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for operating a converter including a transformer comprising a primary side and a secondary side, the converter further including a primary side circuit arrangement coupled to the primary side of the transformer and a secondary side circuit arrangement coupled to the secondary side of the transformer, the method comprising:
   providing, by the secondary side circuit arrangement, at least one of an output voltage and an output current;
   receiving, at a first coupling component, a first information derived from a value of the provided at least one of the output voltage and the output current;
   providing, by the first coupling component, a second information about the first information to the primary side circuit arrangement;
   determining, by the primary side circuit arrangement, a load state of the secondary side based on the received second information,
   generating, by the primary side circuit arrangement, a state switch control signal dependent on the determined load state;
   providing, by a second coupling component, the state switch control signal from the primary side circuit arrangement to a switch circuit arranged on the secondary side;
   providing, by the switch circuit, a primary side circuit arrangement control signal to the primary side circuit arrangement depending on the state switch control signal.

2. The method of claim 1, wherein the converter is configured as an isolated switched mode power supply.

3. The method of claim 1, further comprising, controlling a current flow through the primary side of the transformer by a controller of the primary side circuit arrangement.

4. The method of claim 3, further comprising:
   providing, by a controller, at least one switch control signal to at least one switch coupled to the primary side of the transformer; and
   determining, by the at least one switch, the current flow through the primary side of the transformer based on the at least one switch control signal.

5. The method of claim 4, wherein a modulation circuit of the controller provides the at least one switch control signal to the at least one switch.

6. The method of claim 5, wherein the modulation circuit is configured as a pulse width modulation circuit or as a pulse frequency modulation circuit.

7. The method of claim 3, further comprising:
   providing, by a controller startup circuit, a controller startup signal to the controller depending on at least one of the output voltage and the output current provided at the secondary side.

8. The method of claim 7, wherein the controller includes the controller startup circuit.

9. The method of claim 1, further comprising:
   providing, by at least one of the first coupling component and the second coupling component, a transmission of a signal via a galvanic separation between the primary side circuit arrangement and the secondary side circuit arrangement.

10. The method of claim 9, wherein at least one of the first coupling component and the second coupling component comprises an optocoupler.

11. The method of claim 1, further comprising:
    determining, by the primary side circuit arrangement, a load state in which an output power provided by the by the secondary side circuit arrangement is lower than a predefined threshold power.

12. The method of claim 1, wherein the switch circuit is coupled to the primary side circuit arrangement via the first coupling component.

13. The method of claim 1, wherein the switch circuit is coupled to the primary side circuit arrangement via a third coupling component that is coupled to the primary side circuit arrangement.

14. The method of claim 13, wherein the third coupling component comprises an optocoupler.

15. The method of claim 1, wherein the second information comprises information about one or more non-predetermined values of at least one of the output voltage or the output current.

16. A method for operating a converter including a transformer and including a first circuit arrangement coupled to a first side of the transformer, a second side circuit arrangement coupled to a second side of the transformer, the first circuit arrangement galvanically separated from the second circuit arrangement, the method comprising:
    providing, by the second circuit arrangement, an output voltage at an output coupled to the second circuit arrangement;
    receiving, at a first coupler coupled to the first circuit arrangement, a first information derived from a value of the provided output voltage;
    providing, by the first coupler, a second information about the first information to the first circuit arrangement;
    determining, by the first circuit arrangement, a load state of the second side of the transformer based on the received second information about the output voltage;
    generating, by the first circuit arrangement, a state switch control signal dependent on the determined load state;
    providing, by a second coupler coupled to the first circuit arrangement and coupled to a switch circuit, the state switch control signal from the first circuit arrangement to the switch circuit;
    providing, by the switch circuit, a first circuit arrangement control signal to the first circuit arrangement depending on the state switch control signal,
    wherein the switch circuit is arranged on the second side of the transformer.

17. The method of claim 16, wherein the converter is configured as a forward converter or as a reverse converter.

18. The method of claim 16, wherein the converter is configured as a switch mode power supply converter.

19. The method of claim 16, further comprising:
    controlling, by a controller of the first circuit arrangement, a current flow through the first side of the transformer.

20. The method of claim 19, further comprising:
providing, by a modulation circuit of the controller, at least one switch control signal to an at least one switch that is coupled to the first side of the transformer.

21. The converter of claim 16, further comprising:
determining, by the first circuit arrangement, a load state in which an output power of the output is lower than a predefined threshold power.

22. The method of claim 16, wherein the second information comprises information about one or more non-predetermined values of the output voltage.

23. A method for operating a converter comprising a transformer, the transformer including a primary winding and a secondary winding being galvanically separated from each other, the converter further comprising a first circuit arrangement coupled to the primary winding and a second circuit arrangement coupled to the secondary winding and connected to an output terminal, the method comprising:
providing, by the second circuit arrangement, an output voltage to a load connected to the output terminal;
receiving, at a first coupler, a first information derived from a value of the provided output voltage;
transmitting, by the first coupler, a second information about the first information to the first circuit arrangement;
determining, by the first circuit arrangement, a load state of the secondary winding based on the received second information,
generating, by the first circuit arrangement, a state switch control signal based on the determined load state;
providing, by a second coupler coupled to the first circuit arrangement and to the switch circuit, the state switch control signal from the first circuit arrangement to a switch circuit that is coupled to the second winding; and
providing, by the switch circuit, a first circuit arrangement control signal to the first circuit arrangement depending on the state switch control signal, wherein the switch circuit is non-galvanically coupled to the first circuit arrangement.

24. The method of claim 23, wherein the converter is configured as an AC/DC converter or as a DC/DC converter.

25. The method of claim 23, further comprising:
controlling, by a controller of the first circuit arrangement, a current flow through the primary winding.

26. The method of claim 25, further comprising:
determining, by at least one switch coupled to the controller and the primary winding, the current flow through the primary winding depending on a switch control signal provided by the controller.

27. The method of claim 23, further comprising:
transmitting, by at least one of the first coupler and the second coupler, a signal via a galvanic separation between the first circuit arrangement and the second circuit arrangement.

28. The converter of claim 23, wherein the second information comprises information about one or more non-predetermined values of the output voltage.

* * * * *

UNITED STATES PATENT AND TRADEMARK OFFICE
CERTIFICATE OF CORRECTION

| | |
|---|---|
| PATENT NO. | : 9,590,513 B2 |
| APPLICATION NO. | : 14/533117 |
| DATED | : March 7, 2017 |
| INVENTOR(S) | : Marc Fahlenkamp |

Page 1 of 1

It is certified that error appears in the above-identified patent and that said Letters Patent is hereby corrected as shown below:

In the Claims

Claim 11 - Column 32, Line 15: delete "an output power provided by the by the secondary side circuit" and insert --an output power provided by the secondary side circuit-- in place thereof.

Signed and Sealed this
Sixteenth Day of May, 2017

Michelle K. Lee
*Director of the United States Patent and Trademark Office*